United States Patent
Eguchi et al.

(10) Patent No.: US 8,582,152 B2
(45) Date of Patent: Nov. 12, 2013

(54) IMAGE FORMING APPARATUS WITH MULTI-VIEW DISPLAY

(75) Inventors: Hiroshi Eguchi, Okazaki (JP);
Toshikazu Higashi, Toyokawa (JP);
Tatsuya Eguchi, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 634 days.

(21) Appl. No.: 12/768,908

(22) Filed: Apr. 28, 2010

(65) Prior Publication Data

US 2010/0277762 A1    Nov. 4, 2010

(30) Foreign Application Priority Data

May 1, 2009  (JP) ................................. 2009-112003

(51) Int. Cl.
*G06F 3/12*  (2006.01)

(52) U.S. Cl.
USPC .............. 358/1.15; 715/705; 715/714; 345/5; 345/10; 345/30

(58) Field of Classification Search
USPC ............... 358/1.1, 3.2, 1.15, 1.16, 1.18, 400; 715/700, 706, 716, 727, 729, 771; 345/1.1–1.3, 4, 5; 399/8, 9, 18, 81
See application file for complete search history.

(56) References Cited

U.S. PATENT DOCUMENTS

| | | | | |
|---|---|---|---|---|
| 5,877,961 | A * | 3/1999 | Moore ........................... | 700/180 |
| 6,744,998 | B2 * | 6/2004 | McIntyre ........................ | 399/81 |
| 6,766,331 | B2 * | 7/2004 | Shema et al. .................. | 1/1 |
| 2006/0116884 | A1 * | 6/2006 | Itaki et al. ..................... | 704/271 |
| 2007/0097453 | A1 * | 5/2007 | Kimura ........................... | 358/474 |
| 2007/0195064 | A1 | 8/2007 | Morioka | |
| 2007/0201884 | A1 * | 8/2007 | Yamada .......................... | 399/21 |
| 2008/0218583 | A1 * | 9/2008 | Girish et al. ............... | 348/14.08 |
| 2009/0322522 | A1 * | 12/2009 | Meunier ........................ | 340/540 |

FOREIGN PATENT DOCUMENTS

| | | |
|---|---|---|
| JP | 2000-137414 | 5/2000 |
| JP | 2002-223268 | 8/2002 |
| JP | 2006-218637 A | 8/2006 |
| JP | 2007-226461 | 9/2007 |
| JP | 2007-283967 | 11/2007 |
| JP | 2007-322480 A | 12/2007 |
| WO | WO 2007/097072 | 8/2007 |

OTHER PUBLICATIONS

Japanese Office Action issued on Aug. 6, 2013 by the Japan Patent Office in corresponding Japanese Patent Application No. 2009-112003, and English translation thereof.

* cited by examiner

*Primary Examiner* — Benny Q Tieu
*Assistant Examiner* — Michael Y Tzeng
(74) *Attorney, Agent, or Firm* — Buchanan Ingersoll & Rooney PC

(57) ABSTRACT

An image forming apparatus comprises: an operation part having a display area and operable to receive an input from a user; a first display part operable to display, in a part of the display area, (i) a first image to be visible only from a range of a first viewing angle and (ii) a second image to be visible only from a range of a second viewing angle that does not overlap with the range of the first viewing angle; an audio output part operable to output an audio explaining the first image; and a second display part operable, while the audio explaining the first image is being output, to display, in a remaining part of the display area, a notification indicating that the audio explaining the first image does not correspond to the second image, such that the notification is visible from the range of the second viewing angle.

19 Claims, 16 Drawing Sheets

| Audio key 22a | Audio guide a |
|---|---|
| Audio key 22b | Audio guide b |
| Audio key 22c | Audio guide c |

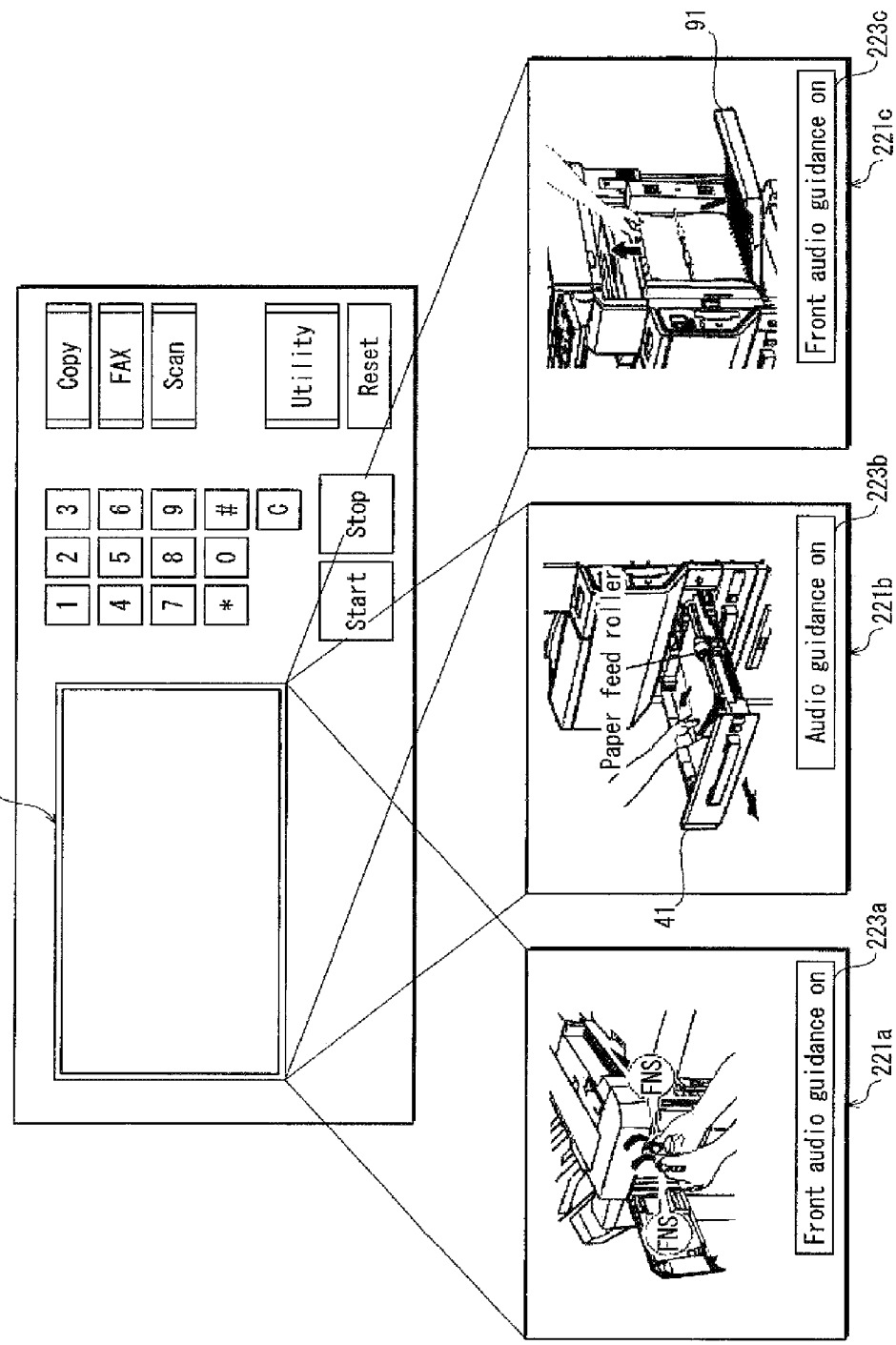

| Audio pattern | Mode | Direction | Mounting option OP |
|---|---|---|---|
| A | In operation | Left | Finisher |
| B | In operation | Left | None |
| C | In operation | Front | Inner finisher |
| D | In operation | Front | None |
| E | In operation | Right | Large-capacity feeding apparatus |
| F | In operation | Right | None |
| G | Standby | — | — |

| Audio pattern | Frequency characteristics | | | | | | | | | |
|---|---|---|---|---|---|---|---|---|---|---|
| | 32Hz | 64Hz | 125Hz | 250Hz | 500Hz | 1KHz | 2KHz | 4KHz | 8KHz | 16KHz |
| A | 3dB | 6dB | 9dB | 7dB | 6dB | 5dB | 7dB | 9dB | 11dB | 8dB |
| B | 3dB | 6dB | 9dB | 7dB | 6dB | 5dB | 6dB | 8dB | 9dB | 8dB |
| C | 3dB | 5dB | 7dB | 5dB | 5dB | 5dB | 6dB | 8dB | 9dB | 8dB |
| D | 3dB | 5dB | 7dB | 5dB | 8dB | 3dB | 6dB | 8dB | 9dB | 8dB |
| E | 5dB | 7dB | 9dB | 11dB | 8dB | 3dB | 6dB | 9dB | 7dB | 6dB |
| F | 5dB | 6dB | 8dB | 9dB | 8dB | 3dB | 6dB | 9dB | 7dB | 6dB |
| G | 0dB | 0dB | 0dB | 0dB | 2dB | 9dB | 10dB | 2dB | 10dB | 3dB |

IMAGE FORMING APPARATUS WITH MULTI-VIEW DISPLAY

This application is based on an application No. 2009-112003 filed in Japan, the contents of which are hereby incorporated by reference.

BACKGROUND OF THE INVENTION (1) Field of the Invention

The present invention relates to an image forming apparatus having an operation part for receiving an input from a user.

(2) Description of the Related Art

An image forming apparatus such as a copier includes a user-friendly function to enhance the usability of the apparatus. For example, Japanese Patent Application Publication No. 2006-218637 discloses an image forming apparatus that includes a display on an operation part (e.g., operation panel) so as to display a state of the apparatus (e.g., the occurrence of a paper jam or an execution state of a job) on the screen. Also, the image forming apparatus outputs an audio guide explaining how to make a copy or how to clear a paper jam. The above-described functions enable the user to set a copy mode as desired or to clear a paper jam while looking at a displayed image on the screen and listening to the audio guide.

Also, Japanese Patent Application Publication No. 2007-322480 discloses an image forming apparatus that has a so-called "multi-view function". In the multi-view function, a display of an operation panel shows first and second images where the first image is only visible from the range of a first viewing angle and the second image is only visible from the range of a second viewing angle that does not overlap with the first viewing angle.

The multi-view function enables simultaneous display of different images and is convenient to the user for the following reasons. With the multi-view function, the user does not need to manually switch between images to look at each of the images. Instead, the user can look at the images by simply tilting his/her face to the right and left in front of the operation panel to adjust to each viewing angle.

In view of improving operability for a user, it is conceivable to have a structure that includes an operation part having the above-described multi-view function, and that outputs an audio guide.

However, operability for a user may not be improved if an audio guide is simply introduced to the operation part having the multi-view function.

For example, assume that a first image is an image for selecting a copy mode and is only visible from the front of an operation panel, and that a second image is an image for showing an execution state of a job and is only visible from a diagonally left direction with respect to the operation panel. Also assume that a user A is listening to an audio guide for the first image in front of the operation panel, and, while the user A is still listening to the audio guide, a user B approaches the copier and attempts to check the execution state of a job by looking at the second image from the diagonally left direction. In this case, the user B may be confused whether or not the audio guide that is being output corresponds to an image that he/she is looking at.

Also, assume that a structure is adopted in which different audio guides are provided for different images, and the audio guides are output by means of manual operations such as pressing keys. This structure, however, requires an operation for switching between the audio guides and complicates the operations of the copier. For example, consider the following case: at the time of paper jams, a first image shows how to clear a paper jam in front of the copier, a second image shows how to clear a paper jam at the left side of the copier, and a user performs operations to clear the paper jams while listening to a first audio guide for the first image and a second audio guide for the second image in sequence. In this case, the user performs operations to clear the paper jam in front of the copier while looking at the first image and listening to the first audio guide. Then, after the paper jam in front of the copier is cleared, the user moves to the left side of the copier to perform different operations to clear the paper jam on the left side.

Therefore, if the user forgets to perform a key input operation for switching to the second audio guide, the user cannot listen to the second audio guide even though he/she can look at the second image from the left direction. As a result, the user is forced to go back to the front of the copier to perform the key input operation for switching.

SUMMARY OF THE INVENTION

In view of the above-described problems, an object of the present invention is to provide an image forming apparatus that outputs audio and includes an operation part having a multi-view function, thereby improving operability for a user.

The above-described object is achieved by an image forming apparatus comprising: an operation part having a display area and operable to receive an input from a user; a first display part operable to display, in a part of the display area, (i) a first image to be visible only from a range of a first viewing angle and (ii) a second image to be visible only from a range of a second viewing angle that does not overlap with the range of the first viewing angle; an audio output part operable to output an audio explaining the first image; and a second display part operable, while the audio explaining the first image is being output, to display, in a remaining part of the display area, a notification indicating that the audio explaining the first image does not correspond to the second image, such that the notification is visible from the range of the second viewing angle.

Also, the above-described object is achieved by an image forming apparatus comprising: an operation part operable to receive an input from a user; a display part operable to display (i) a first image to be visible only from a range of a first viewing angle and (ii) a second image to be visible only from a range of a second viewing angle that does not overlap with the range of the first viewing angle; a detector operable to detect a location of the user with respect to the operation part; a selector operable to select an audio to be output based on the location detected by the detector, the audio to be output being one of an audio explaining the first image and an audio explaining the second image; and an audio output part operable to output the selected audio.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 5 shows an example of an audio correspondence table provided for the operation display part;

FIG. 9 shows a display example of the images for the left, front and right directions that are simultaneously displayed on a display according to Embodiment 2;

FIGS. 15A and 15B show examples of a pattern information table and a frequency characteristics table according to Embodiment 3.

DESCRIPTION OF THE PREFERRED EMBODIMENTS

The following describes preferred embodiments of an image forming apparatus according to the present invention, using a digital copier (hereinafter, simply "copier") as an example.

<Embodiment 1>

Figure 1A:
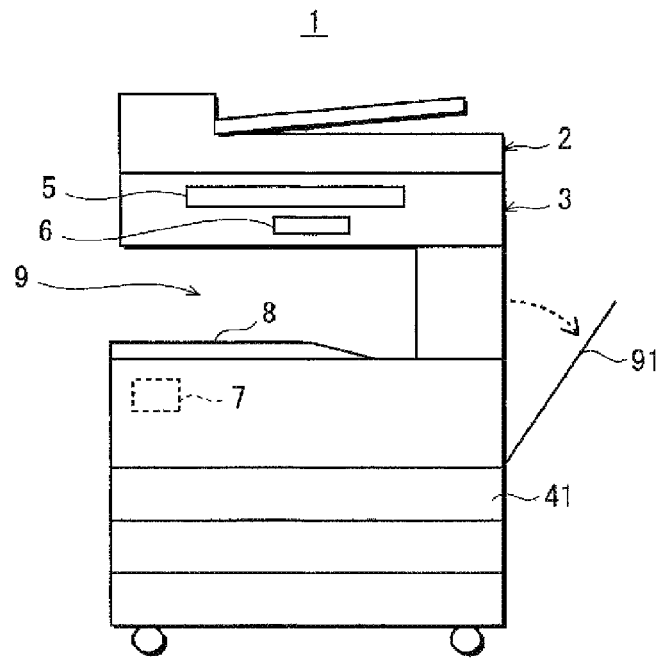
FIGS. 1A and 1B schematically show an overall structure of a copier according to Embodiment 1.
Figure 1B:
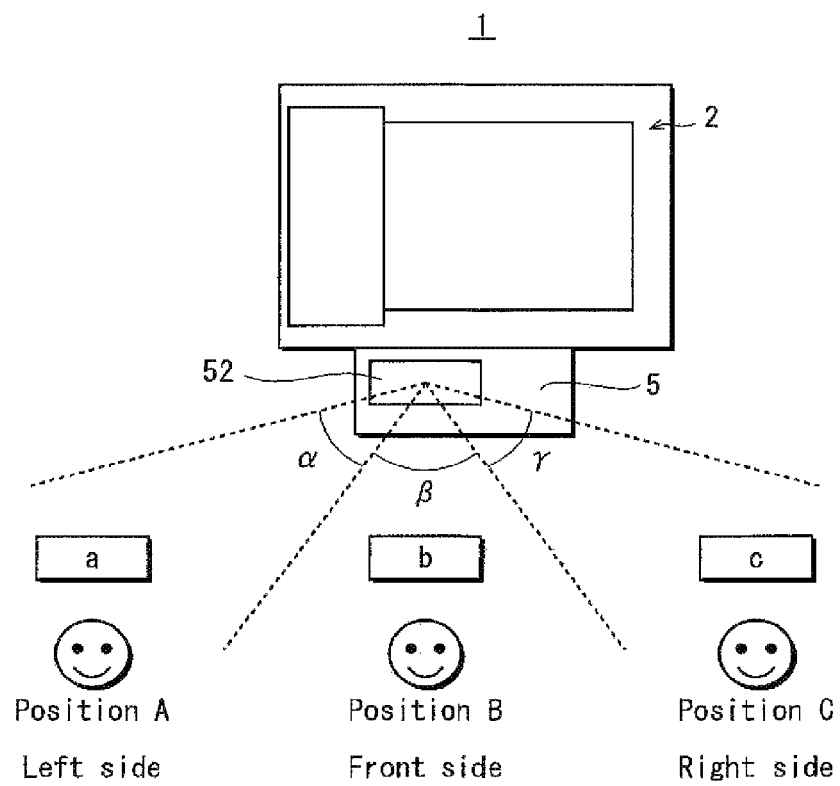

FIGS. 1A and 1B schematically show an overall structure of a copier 1 according to the present embodiment. FIG. 1A is a front view and FIG. 1B is a planar view.

As shown in FIGS. 1A and 1B, the copier 1 is a color copier including an automatic document conveyor 2, a scanner 3, a printer 4, an operation display part 5, a human body detector 6, and a controller 7. The copier 1 executes various jobs, such as a scan job for reading the image of a document, a copy job for printing an image on a sheet based on image data obtained by reading the image, and a print job for, upon request from an external terminal device (not shown) connected via a network such as a LAN, printing an image pertaining to the requested job onto a sheet.

The copier 1 is of a so-called "in-body ejection type", where the printer 4 is arranged below the scanner 3 with a space 9 inbetween, and a printed sheet ejected by the printer 4 is received by the tray 8 provided above the printer 4. Note that although not shown, the copier 1 may be connected to an optional apparatus. For example, the optional apparatus may be a post-processing apparatus such as a finisher, or a large-capacity feeding apparatus. The post-processing apparatus sorts sheets ejected from the printer 4, and punches a hole in the sheets. The large-capacity feeding apparatus is capable of housing a large number of sheets and feeds the sheets to the printer 4 one by one.

The automatic document conveyor 2 conveys a document placed therein to a reading position of the scanner 3.

The scanner 3 obtains image data by reading an image on the document conveyed by the automatic document conveyor 2. The printer 4 forms an image based on the image data obtained by the scanner 3 or print job data from the external terminal device, with use of a well-known electrographic method.

The operation display part 5 is arranged in a convenient position where a user can easily perform operations when he/she stands in front of the copier 1. Here, the operation display part 5 is arranged on a front surface of the scanner 3. As shown in FIG. 1B, the right and left sides of the copier 1 refer to the right and left sides of a position where the operation display part 5 is seen from the front of the copier 1.

The operation display part 5 includes a display 52 having a multi-view function, and simultaneously displays images on the display 52 to be visible from a plurality of directions. In the present embodiment, the operation display part 5 displays images to be visible from three directions. Specifically, the operation display part 5 displays (i) an image a such that the image a is only visible from the range of a viewing angle α (i.e., diagonally left range) that includes a position A on the left side of the copier 1, (ii) an image b such that the image b is only visible from the range of a viewing angle β (i.e., front range) that includes a position B in front of the copier 1 and that does not overlap with the angle α, and (iii) an image c such that the image c is only visible from the range of a viewing angle γ (i.e., diagonally right range) that includes a position C on the right side of the copier 1 and that does not overlap with the viewing angles α and β. Hereinafter, the image a may sometimes be referred to as "a left-view image", the image b as "a front-view image", and the image c as "a right-view image".

Figure 2:
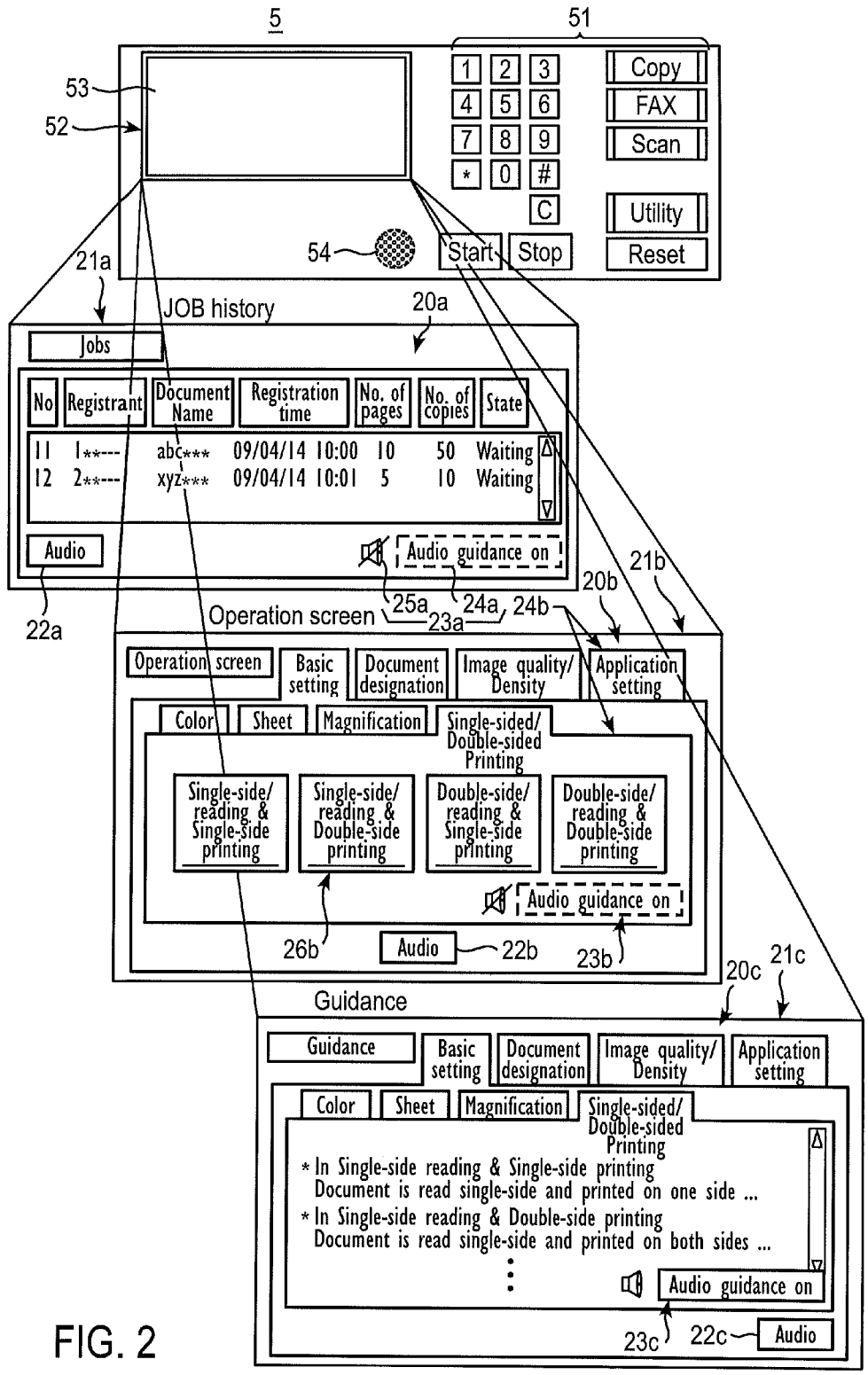
FIG. 2 is an enlarged planar view of an operation display part provided for the copier.

FIG. 2 is an enlarged planar view of the operation display part 5, and shows specific display examples of the images a to c. As shown in FIG. 2, the operation display part 5 includes keys 51, the display 52, a touch panel 53, and a speaker 54.

The keys 51 are so-called "hard keys" and include a numeric keypad, a copy start key, and a copy stop key. The display 52 is a liquid crystal display having the above-described multi-view function. The touch panel 53 is translucent and arranged on a surface of the display 52. The speaker 54 outputs an audio guide that is described below.

Of images 21a to 21c simultaneously displayed on the display 52, the image 21a corresponds to a left-view image, the image 21b to a front-view image, and the image 21c to a right-view image.

Image 21a

The image 21a includes an image 20a that indicates a job history where information is listed for each job. The information includes, for example, a job number, a registrant, a document name, registration time, the number of pages, the number of copies, and a state (executing, waiting, end, etc.). The image 20a includes an audio key 22a that is a so-called "soft key" for receiving a touch input from a user. The audio key 22a is a key for outputting, from the speaker 54, an audio guide a that explains the image 21a currently being displayed. For example, the audio guide a may be audio notifying the following message: "You can display a list of (i) a job currently being executed, (ii) waiting jobs, and (iii) the history of past jobs". Hereinafter, keys refer to soft keys.

The image 21a includes a notification 23a. The notification 23a is composed of a character part 24a and a graphic part 25a, so that the user can visually check whether or not audio currently being output is the audio guide a.

When audio currently being output is the audio guide a, the character part 24a displays a message saying "audio guidance on", and the graphic part 25a displays a graphic of a speaker.

The message and the graphic are displayed so as to notify the user that the audio currently being output corresponds to the image that the user is looking at. By looking at the displays (i.e., the message and the graphic), the user understands that the audio guidance currently being output corresponds to the image that he/she is looking at. Hereinafter, these displays are collectively referred to as "corresponding audio display".

Meanwhile, when audio currently being output is not the audio guide a (i.e., the audio is either an audio guide b or an audio guide c, which are described below), the character part 24a displays a message saying "audio guidance on" in grayed-out characters, and the graphic part 25a displays a graphic of a speaker with a slash through it, as shown in FIG. 2. The message and the graphic are displayed so as to notify the user that the audio currently being output does not correspond to the image that he/she is looking at. Hereinafter, these displays are collectively referred to as "non-corresponding audio display".

By looking at the non-corresponding display, the user understands that the audio guidance currently being output corresponds to an image different from the image that the user is looking at.

The notification 23a changes its display form depending on which audio guide is currently being output. In other words, the notification 23a shows either the corresponding audio display or the non-corresponding audio display. The same applies to the notifications 23b and 23c of the images b and c. Details of this display control are described below. Here, the image 20a is displayed in a part of a display area of the operation display part 5, and the notification 23a is displayed in a remaining part of the display area thereof. The same applies to the images 20b and 20c and the notifications 23b and 23c.

Image 21b

The image 21b includes an image 20b that indicates an operation menu. The image 20b includes keys 24b, keys 26b, and an audio key 22b. The keys 24b serve as tabs for receiving touch inputs from a user, such as Basic setting, Document Designation, Image Quality/Density, Application Setting, Color, Sheet, Magnification, and Single-sided/Double-sided Printing. The keys 26b are provided to receive a selection from among functions included in each item indicated by the respective tabs.

The audio key 22b is a key for outputting, from the speaker 54, an audio guide b that explains the image 21b that is currently being displayed. For example, the audio guide b may be audio notifying the following message: "Color image quality is adjustable by selecting the Color tab. Sheets to be used are selectable by selecting the Sheet tab. A desired magnification ratio is settable by selecting the Magnification tab . . . "

The image 21b includes a notification 23b. The notification 23b has a similar structure as the notification 23a, and is provided so as to allow the user to visually check whether or not audio currently being output is the audio guide b. When audio currently being output is the audio guide b, the corresponding audio display is displayed as the notification 23b. When audio currently being output is not the audio guide b (i.e., the audio is either the audio guide a or the audio guide c), the non-corresponding audio display is displayed as the notification 23b as shown in FIG. 2.

Image 21c

The image 21c includes an image 20c that indicates a text guidance explaining the functions of the keys 26b that are currently being displayed on the operation menu of the image 21b. The image 20c includes an audio key 22c. The audio key 22c is a key for outputting, from the speaker 54, an audio guide c that explains the functions that are currently being shown on the image 21c. For example, the audio guide c may be audio notifying the following message: "When you select a Single-side Reading and Double-side Printing tab, two pages of a single-sided document are read. Then, an image on one of the pages is printed on a front surface of a sheet, and an image of the other one of the pages is printed on a back surface of the sheet . . . "

The image 21c includes a notification 23c. The notification 23c has a similar structure as the notification 23a, and is provided so as to allow the user to visually check whether or not audio currently being output is the audio guide c. When audio currently being output is the audio guide c, the corresponding audio display is displayed as the notification 23c as shown in FIG. 2. When audio currently being output is not the audio guide c (i.e., the audio is either the audio guide a or the audio guide b), the non-corresponding audio display is displayed as the notification 23c.

The images 21a to 21c are of course some of the examples of displayed images, and may be switched, by a key input operation or the like, to the images a to c that indicate other contents. Note that, in the left-view, front-view and right-view images that are displayed simultaneously, each key is displayed in a different position (i.e., so as not to overlap with each other) on a coordinate axis. When a key input is made, a key used for the key input is identified with reference to information indicating coordinate positions corresponding one-to-one to the keys.

By changing an angle at which a user looks at the display 52 within the range of the viewing angles shown in FIG. 1, the user can selectively look at the images 21a to 21c that are simultaneously displayed on the display 52. Also, by performing a touch input with an audio key in an image that the user is looking at, the user can cause an audio guide corresponding to the image to be output from the speaker 54. Furthermore, with the notification of the image that the user is looking at, the user can understand whether or not audio currently being output is an audio guide explaining the image that the user is looking at. Hereinafter, the audio guide a may sometimes be referred to as "left audio guide", the audio guide b as "front audio guide", and the audio guide c as "right audio guide".

Referring back to FIG. 1, the human body detector 6 detects whether or not the user is in the vicinity of the copier 1 and in one of the left, front, and right sides of the copier 1 with respect to the operation display part 5. The human body detector 6 may be, for example, an infrared sensor. The infrared sensor includes: a light source part for emitting infrared rays; and a light receiver for receiving reflection light that is generated by the reflection of the emitted infrared rays against an object (user) that exists in a travelling direction of the infrared rays. Here, three infrared sensors, namely first, second, and third sensors are arranged. In a horizontal direction, the first sensor has a detection area in the range of the viewing angle $\alpha$, the second sensor has a detection area in the range of the viewing angle $\beta$, and the third sensor has a detection area in the range of the viewing angle $\gamma$. Each of the sensors transmits a detection signal of reflection light to the operation display unit 5, upon receipt of the reflection light. Note that the human body detector 6 may come in any form as long as it detects a user in the vicinity of the copier 1. For example, the light-receiving sensitivity of the human body detector 6 may be adjusted in advance in a manner that the human detector 6 detects a user within a radius of approximately 1 [m] from the copier 1.

The copier 1 has a jam detection function for detecting a paper jam on a conveyance path of a recording sheet, and a place at which the paper jam has occurred. Also, the copier 1 has a function for causing the display 52 to display an image (see FIG. 9 described below) that shows how to clear the paper jam. In a case where paper jams occur in more than one place and different operations are required to clear the paper jams in the respective places, up to three images that show how to clear the paper jams are simultaneously displayed.

Specifically, assume that, in order to clear paper jams, it is necessary to separately perform (i) a first operation for removing a jammed sheet by pulling a paper feeding cassette 41 toward the puller (i.e., user) in front of the copier 1 and (ii) a second operation for removing another jammed sheet inside the copier 1 by opening a right cover 91. In this case, a first image (image 221*b* in FIG. 9) showing the first operation is displayed as the front-view image, and a second image (image 221*c* in FIG. 9) showing the second operation is displayed as the right-view image.

In this way, the user can perform the first operation to clear the jam occurred in the front of the copier 1 while looking at the first image from the front of the copier 1. Also, the user can perform the second operation to clear the jam occurred on the right side of the copier 1 while looking at the second image from the right side of the copier 1. Note that operations for clearing paper jams occurred in the left, front, and right sides of the copier 1 are respectively performed in the left, front, and right sides of the copier 1.

Figure 3:
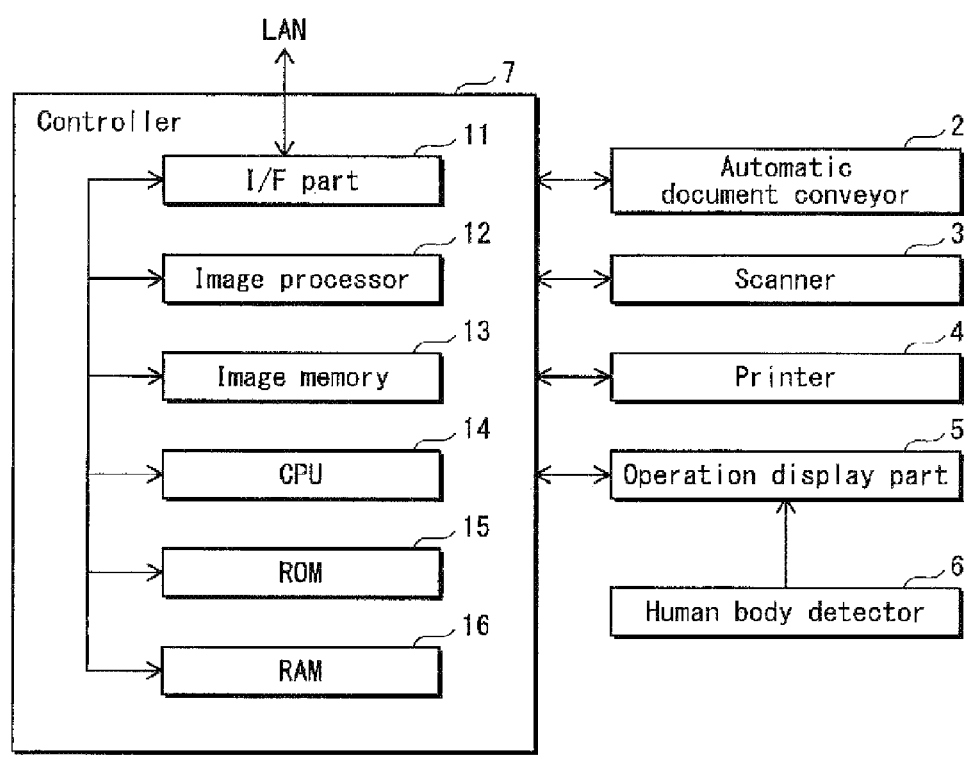
FIG. 3 is a block diagram showing a structure of a controller provided for the copier.

FIG. 3 is a block diagram showing a structure of the controller 7.

As shown in FIG. 3, the controller 7 includes, as main components, a communication interface (I/F) part 11, an image processor 12, an image memory 13, a CPU 14, a ROM 15, a RAM 16, etc., and each component is mutually communicable via a bus.

The communication I/F part 11 is an interface for connecting to a LAN such as a LAN card or a LAN board. Upon receipt of data on a print job from an external device, the communication I/F part 11 transmits the data to the image processor 12.

The image processor 12 converts (i) data on a print job received from the communication I/F part 11 and (ii) image data obtained from the scanner 3, into color image data having reproduction colors of, for example, yellow (Y), magenta (M), cyan (C) and black (K). Then, the image processor 12 outputs the converted image data to the image memory 13 so as to store the converted image data into the image memory 13 for each reproduction color.

The CPU 14 reads necessary programs from the ROM 15, and controls (i) conversion processing of image data by the image processor 12, (ii) writing/reading of image data by the image memory 13, and (iii) operations of the automatic document conveyor 2, scanner 3, and printer 4, while adjusting the timing appropriately, so as to ensure smooth execution of jobs such as copying and printing. The ROM 15 stores a control program related to operations such as conveying documents, reading document images, and forming images. The RAM 16 is used as a work area of the CPU 14.

Figure 4:
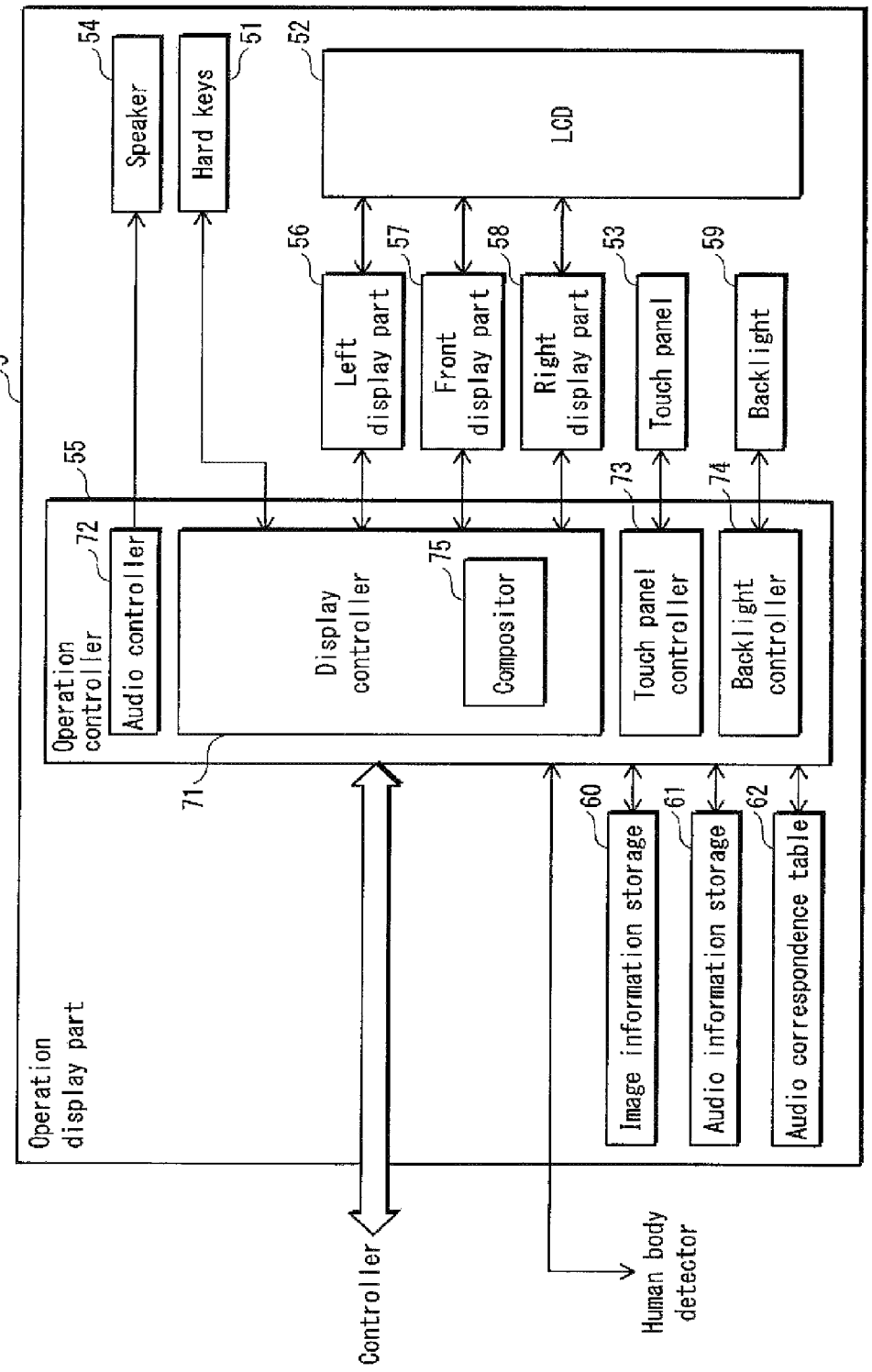
FIG. 4 is a block diagram showing a structure of the operation display part.

FIG. 4 is a block diagram showing a structure of the operation display part 5.

As shown in FIG. 4, the operation display part 5 includes an operation controller 55, a left display part 56, a front display part 57, a right display part 58, a backlight 59 provided on a back surface of the display 52, an image information storage 60, an audio information storage 61, and an audio correspondence table 62, in addition to the keys 51, the display (LCD) 52, the touch panel 53, and the speaker 54.

The image information storage 60 stores, in advance, data of all the images to be displayed (e.g., the above-described image 21*a* and images for clearing paper jams). Also, the image information storage 60 stores data for displaying the corresponding audio display and the non-corresponding audio display as the notifications 23*a* to 23*c*. The data of the notifications are prepared separately from other data because of the following reason. That is, as described below, while audio is being output, data of a displayed image is composited with data of a notification to generate one data set on one image including both of the displayed image and the notification. Then, the image based on the data set is displayed so that the notification overlaps with the displayed image of the display 52. Hereinafter, data of the corresponding audio display is referred to as "corresponding display data" and data of the non-corresponding audio display as "non-corresponding display data".

The audio information storage 61 stores, in advance, data of all the audio guides (e.g., the above-described audio guide a) that explain the contents of displayed images.

As shown in FIG. 5, the audio correspondence table 62 includes information indicating audio keys corresponding one-to-one to audio guide to be output. With reference to the audio correspondence table 62, the copier 1 determines, for example, that the audio guide a is output upon receipt of a touch input of the audio key 22*a*. Note that FIG. 5 only shows the audio keys 22*a* to 22*c* as examples. However, if there is another audio guide corresponding to another audio key, the audio correspondence table 62 additionally includes information indicating the audio key corresponding to the audio guide, where the audio guide is output upon receipt of a touch input of the audio key.

Referring back to FIG. 4, the operation controller 55 includes a display controller 71, an audio controller 72, a touch panel controller 73, and a backlight controller 74. The backlight controller 74 controls lighting of the backlight 59. The touch panel controller 73 detects the coordinate position of a portion of the touch panel 53 where a touch input has been performed. Then, the touch panel controller 73 transmits a result of the detection to the display controller 71.

The display controller 71 determines which key has been used by a user to perform a touch input (i.e., to make a selection), based on the coordinate position transmitted from the touch panel controller 73. Specifically, the display controller 71 stores, in advance, key coordinate position information indicating the coordinate position of each key that is displayed on the display 52. The display controller 71 refers to the key coordinate position information to determine a key located at the same position as the coordinate position transmitted from the touch panel controller 73. Also, upon receipt of an input with a hard key 51, the display controller 71 determines which hard key has been pressed by a user.

The display controller 71 handles results of these determinations as input information, and instructs the controller 7 to execute a job such as copying, based on the input information.

Also, the display controller 71 controls the display of the left-view, front-view, and right-view images. Specifically, the display controller 71 reads, from the image information storage 60, data of the images a to c that are to be displayed, based on the identification number of each of the images a to c. Then, the display controller 71 transmits the read data to the left display part 56, the front display part 57, and the right display part 58, and instructs the display parts 56, 57, and 58 to display images based on the data.

When audio is being output, the display controller 71 reads the corresponding display data and the non-corresponding display data so as to display notifications. A compositor 75 composites the corresponding display data with data, of any of the images a to c that requires the corresponding audio display, so that the image includes the corresponding audio display as shown in the image 21c. Then, the compositor 75 transmits the resultant composite data to a corresponding display part.

Also, the compositor 75 composites the non-corresponding display data with data of any of the images a to c that requires the non-corresponding audio display, so that the image includes the non-corresponding audio display as shown in the image 21a. Then, the compositor 75 transmits the resultant composite data to a corresponding display part.

The left, front, and right display parts 56 to 58 simultaneously display the images a to c on the display 52, based on the instruction from the display controller 71. A description of this display control is omitted, since it is a well-known technique similarly to the structure of the display 52 with a multi-view function, such as a so-called "dual view" or "triple view" function.

Furthermore, upon receipt of a touch input with any of the audio keys 22a to 22c, the display controller 71 transmits information indicating the audio key used for the touch input to the audio controller 72.

Upon receipt of the information on the audio key from the display controller 71, the audio controller 72 specifies an audio guide corresponding to the audio key by referring to the audio correspondence table 62. For example, when the audio key 22a is used for a touch input, the audio controller 72 specifies the audio guide a. Then, the audio controller 72 reads data of the audio guide a from the audio information storage 61 based on the identification number of the audio guide a, and outputs audio based on the read data via the speaker 54.

Figure 6:
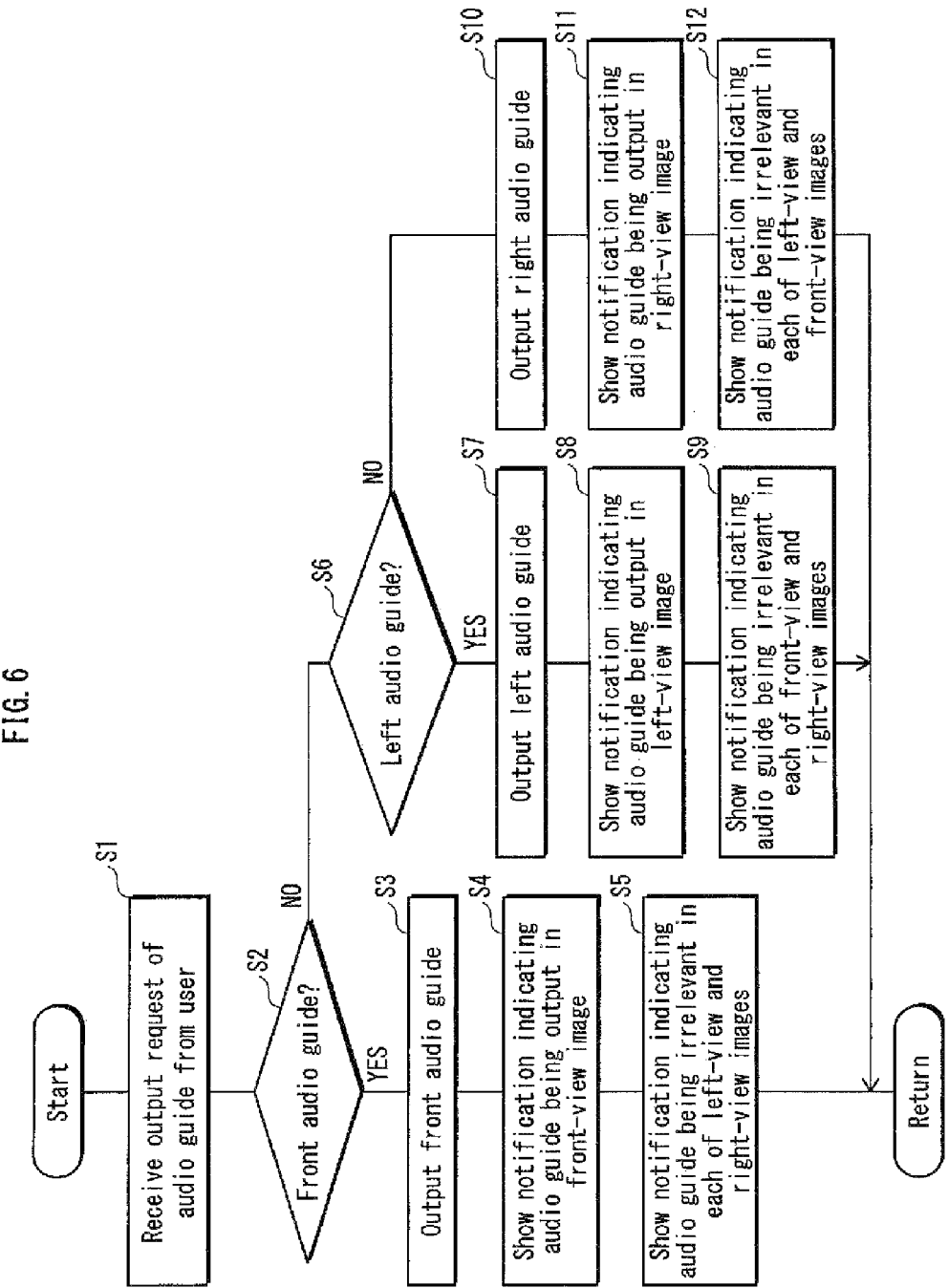
FIG. 6 is a flowchart showing an operation in which the operation controller of the operation display part controls a notification and an audio guide output.

FIG. 6 is a flowchart showing an operation in which the operation controller 55 controls the notification and audio output. The operation is performed each time there is a call from a main routine (not shown).

As shown in FIG. 6, the operation controller 55 receives an output request of an audio guide from a user (step S1). Here, the receipt of the output request refers to the receipt of a touch input with any of the audio keys 22a to 22c.

The operation controller 55 judges whether or not the requested audio is the front audio guide b (step S2). The judgment is made as to whether or not the audio key used for the touch input is the audio key 22b.

When judging that the requested audio is the audio guide b, namely the audio key 22b has been used for the touch input ("YES" in step S2), the operation controller 55 reads data of the audio guide b, and outputs audio based on the read data via the speaker 54 (step S3). This enables the user who is looking at the front-view image b to perform operations while listening to the front audio guide b that is being output.

Subsequently, the operation controller 55 shows, in the front-view image b, a notification indicating that the audio guide is being output for the image b (step S4). In other words, the operation controller 55 composites the corresponding display data with the data of the front-view image b, so that the image b includes the corresponding audio display. Then, the operation controller 55 transmits the resultant composite data to the front display part 57, and causes the display 52 to display an image that includes the corresponding audio display.

Then, the operation controller 55 shows, in each of the left-view image a and the right-view image c, a notification indicating that the audio guide currently being output is irrelevant (step S5). In other words, the operation controller 55 composites the non-corresponding display data with the data of the left-view image a, and also composites the non-corresponding display data with the data of the right-view image c, so that each of the images a and c includes the non-corresponding audio display. Then, the operation controller 55 transmits each of the resultant composite data pieces to the left display part 56 and the right display part 58, respectively, and causes the display 52 to display images that each include the non-corresponding audio display. Then the processing returns to the main routine.

This prevents, for example, a user from getting confused whether or not audio currently being output corresponds to an image that he/she is looking at. Specifically, suppose that while a first user is looking at the front-view image b, a second user approaches the copier 1 and looks at the left-view image a or the right-view image c. In this case, the second user understands that the audio guide b that is currently being output does not correspond to the image a/the image c, by looking at the non-corresponding audio display in the image a/image c. This prevents confusion of the user.

When judging that the requested audio is not the audio guide b ("NO" in step S2), the operation controller 55 judges whether or not the requested audio is the audio guide a for the left of the copier 1 (step S6). The judgment is made as to whether or not the audio key used for a touch input to make the request is the audio key 22a.

When judging that the requested audio is the audio guide a, namely the audio key 22a has been used for the touch input ("YES" in step S6), the operation controller 55 reads data of the audio guide a, and outputs audio based on the read data via the speaker 54 (step S7). This enables the user who is looking at the left-view image a to perform operations while listening to the left audio guide a that is being output.

Subsequently, the operation controller 55 shows, in the left-view image a, a notification indicating that the audio guide is being output for the left-view image a (step S8). In other words, the operation controller 55 composites the corresponding display data with the data of the left-view image a, so that the image a includes the corresponding audio display. Then, the operation controller 55 transmits the resultant composite data to the left display part 56, and causes the display 52 to display an image that includes the corresponding audio display.

Then, the operation controller 55 shows, in each of the front-view image b and the right-view image c, a notification indicating that the audio guide currently being output is irrelevant (step S9). In other words, the operation controller 55 composites the non-corresponding display data with the data of the front-view image b, and also composites the non-corresponding display data with the data of the right-view image c, so that each of the images b and c includes the non-corresponding audio display. Then, the operation controller 55 transmits each of the resultant composite data pieces to the front display part 57 and the right display part 58, respectively, and causes the display 52 to display images that each include the non-corresponding audio display. Then the processing returns to the main routine.

This prevents a user from getting confused whether or not audio currently being output corresponds to an image that he/she is looking at. Specifically, suppose that while a first user is looking at the left-view image a, a second user approaches the copier 1 and looks at the right-view image c. In this case, the second user understands that the audio guide a that is currently being output does not correspond to the image c, by looking at the non-corresponding audio display in the image c. This prevents confusion of the user.

When judging that the requested audio is not the audio guide a ("NO" in step S6), the operation controller 55 judges that the requested audio is the audio guide c for the right of the copier 1, reads data of the audio guide c, and outputs audio based on the read data via the speaker 54 (step S10). This enables the user who is looking at the right-view image c to perform operations while listening to the right audio guide c that is being output.

Subsequently, the operation controller 55 shows, in the right-view image c, a notification indicating that the audio guide is being output for the right-view image c (step S11). In other words, the operation controller 55 composites the corresponding display data with the data of the right-view image c, so that the image c includes the corresponding audio display. Then, the operation controller 55 transmits the resultant composite data to the right display part 58, and causes the display 52 to display an image (e.g., image 23c) that includes the corresponding audio display.

Then, the operation controller 55 shows, in each of the left-view image a and the front-view image b, a notification indicating that the audio guide currently being output is irrelevant (step S12). In other words, the operation controller 55 composites the non-corresponding display data with the data of the left-view image a, and also composites the non-corresponding display data with the data of the front-view image b, so that each of the images a and b includes the non-corresponding audio display. Then, the operation controller 55 transmits each of the resultant composite data pieces to the left display part 56 and the front display part 57, respectively, and causes the display 52 to display images (e.g., images 23a and 23b) that each include the non-corresponding audio display. Then the processing returns to the main routine.

This prevents a user from getting confused whether or not audio currently being output corresponds to an image that he/she is looking at. Specifically, suppose that while a first user is looking at the right-view image c, a second user approaches the copier 1 and looks at the left-view image a. In this case, the second user understands that the audio guide c that is currently being output does not correspond to the image a, by looking at the non-corresponding audio display in the image a. This prevents confusion of the user.

As described above, of a plurality of images simultaneously displayed using a multi-view function, an image irrelevant to an audio guide that is being output includes a notification indicating that the audio corresponds to another image. Therefore, by looking at the notification, the user understands that the audio guidance currently being output is irrelevant to the image that the user is looking at. This prevents the user from getting confused whether or not the audio guide corresponds to an image he/she is looking at.

In the above-described structure, the notification is displayed after being overlaid on each of the left-view, front-view, and right-view images. However, the following structure is also possible. That is, the human body detector 6 may detect a location (one of the left, front, and right) of a user with respect to the copier 1. Then, the notification may be switched between on and off states, depending on the location of the user. Specifically, in a case where one user is in front of the copier 1 and another user on the left thereof, the notifications are displayed only on the front-view and left-view images. In this way, processing such as composition and generation of data for showing the notification in the right-view image does not need to be performed, thus reducing the processing load.

<Other Examples of Notification>

(1) The notifications are not limited to those described above. For example, notifications 123a to 123c as shown in FIG. 7 may be used instead of the notifications 23a to 23c.

Figure 7:
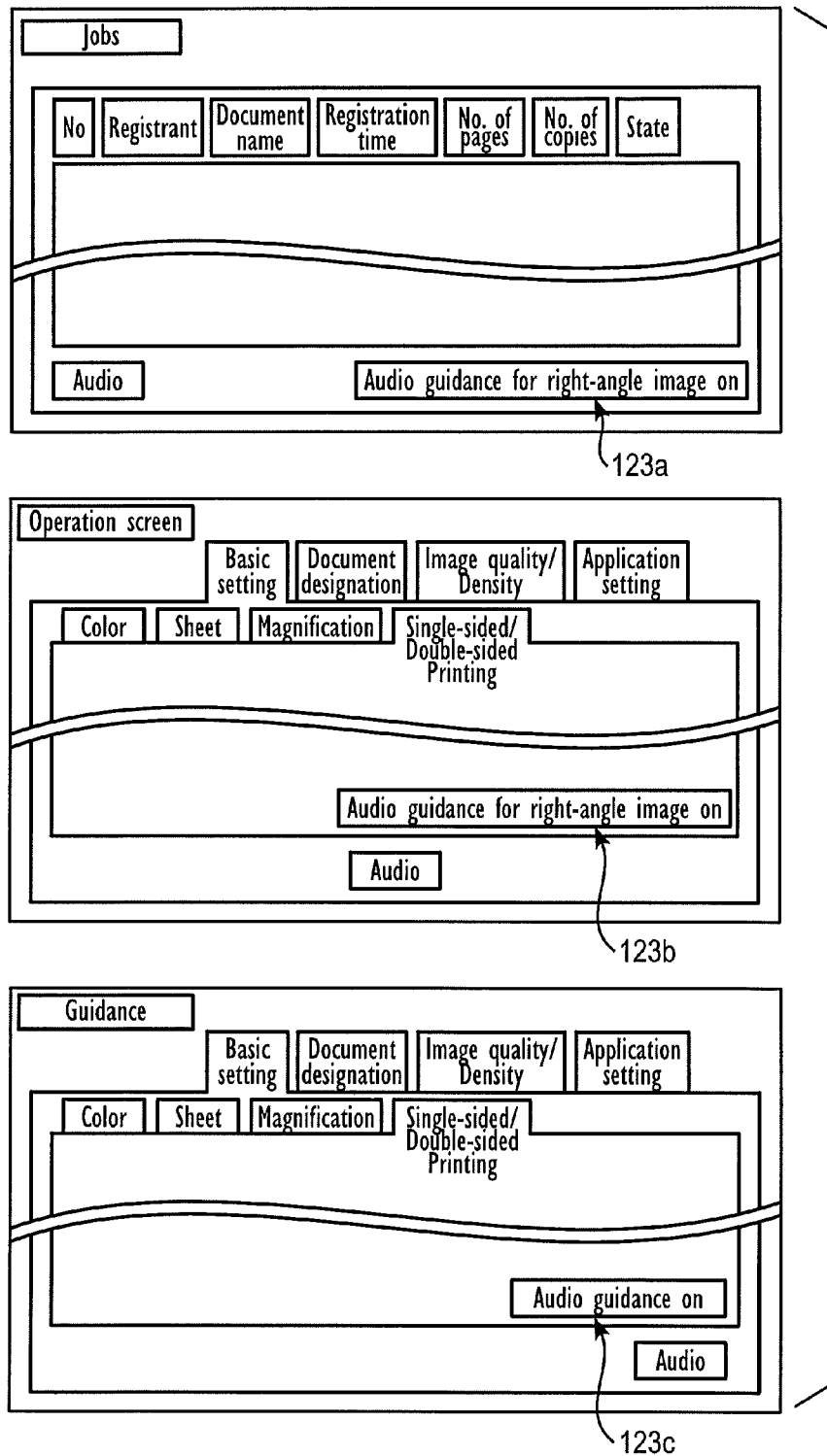
FIG. 7 shows another example of showing a notification.

In FIG. 7, each of the notifications 123a and 123b corresponds to the non-corresponding audio display, and the notification 123c corresponds to the corresponding audio display. Each of the notifications 123a and 123b informs that audio currently being output corresponds to a different image, byway of a character message indicating the position (i.e., angle) of the different image. This enables the user to determine whether the audio currently being output corresponds to an image that the user is looking at, based on (i) the position of the image that the user is looking at and (ii) the position of an image indicated by the notification that the image corresponds to the audio guide currently being output.

(2) Also, the above describes that the display 52 displays both of the notification and images. However, it is not limited to such. For example, a display part different from the display 52 may be provided so as to cause the display part to display the notification.

Figure 8A:
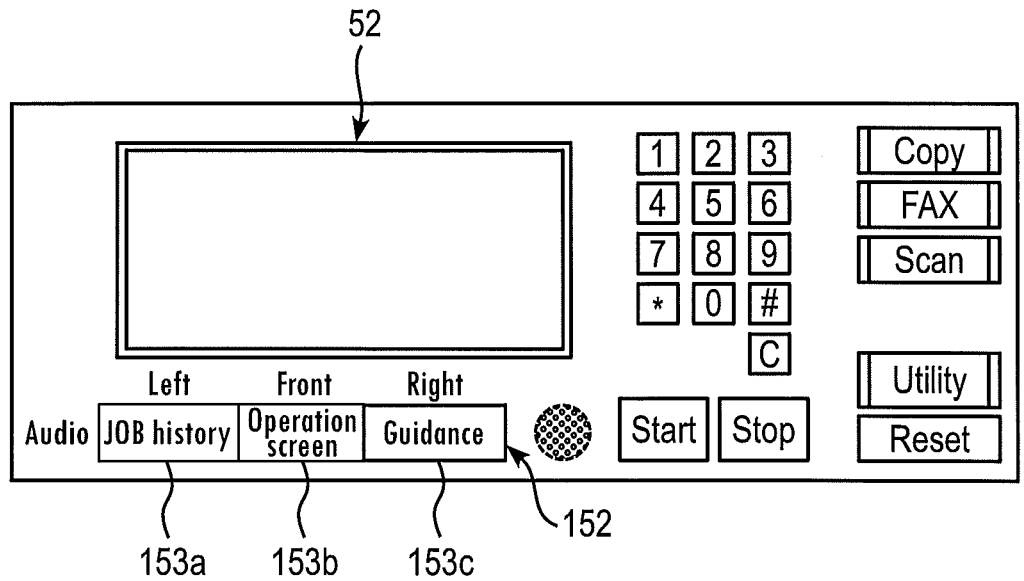
FIGS. 8A and 8B show yet another example of showing a notification.
Figure 8B:
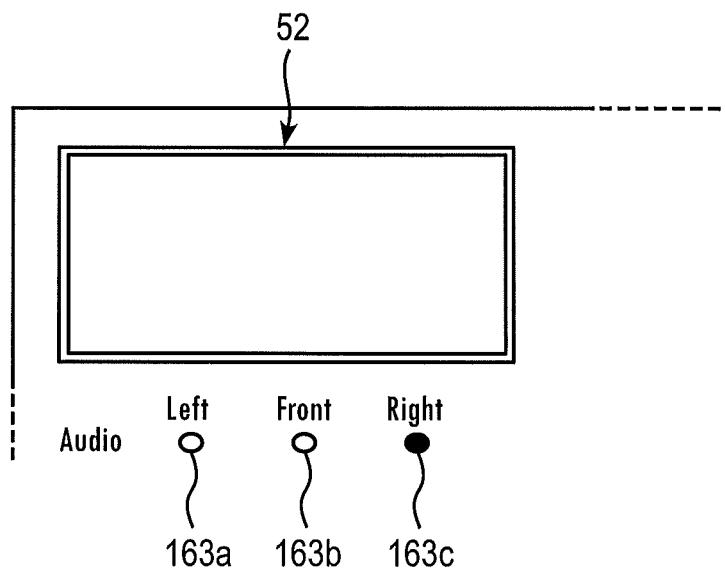

FIGS. 8A and 8B each show an example of a structure for the notification to be displayed on a display part different from the display 52, where FIG. 8A shows a structure using a different display, and FIG. 8B shows a structure using lamps.

In FIG. 8A, the notification is displayed on a display (LCD) 152 provided separately from the display 52. The display 152 is positioned below the display 52 in a planar view.

The display 152 is a normal display (i.e., a display without a multi-view function). The display 152 is divided into three display portions, namely display portions 153a, 153b, and 153c. The display portion 153a displays a notification corresponding to the left-view image a. The display portion 153b displays a notification corresponding to the front-view image b. The display portion 153c displays a notification corresponding to the right-view image c.

In FIG. 8A, the display portions 153a and 153b are grayed out, and the display portion 153c displays a character message saying "guidance". The character message indicates the corresponding audio display, and the grayed-out display indicates the non-corresponding audio display. Note that the display portions may be hidden to function as the non-corresponding display, instead of being grayed out.

When an audio key is used for a touch input, the operation controller 55 causes, from among the display portions 153a to 153c, a display portion corresponding to the audio key (i.e., corresponding to audio guide currently being output) to show the character message, and further causes the other display portions to be grayed out. For example, in a case where the audio key 22a is used for a touch input, the operation controller 55 causes the display portion 153a to show a message indicating a job history, and further causes the other display portions 153b and 153c to be grayed out. Also, in a case where the audio key 22b is used for a touch input, the operation controller 55 causes the display portion 153b to show a message indicating an operation menu, and further causes the other display portions 153a and 153c to be grayed out.

Furthermore, in a case where the audio key 22c is used for a touch input, the operation controller 55 causes the display portion 153c to show a message indicating a guidance, and further causes the other display portion 153a and 153b to be grayed out.

In this way, while looking at an image displayed on the display 52, the user can look at the display 152 positioned below the display 52, check whether or not a message is displayed in a display portion corresponding to the image that he/she is looking at, and thereby determine whether or not the audio currently being output corresponds to the image. Note that although being grayed out in the above-described example, each of the display portions may instead be hidden to function as the non-corresponding display. Here, the display 52 is a part of the display area of the operation display part 5, and the display 152 is a remaining part of the display area thereof.

FIG. 8B shows a structure where three lamps, namely LEDs 163a, 163b, and 163c are used for the notifications by turning the lamps on and off.

In other words, the LED 163a corresponds to the notification for the left-view image a. The LED 163b corresponds to the notification for the front-view image b. The LED 163c corresponds to the notification for the right-view image c.

In FIG. 8B, the LEDs 163a and 163b are turned off, and the LED 163c is turned on. The LEDs 163c in the turned-on state functions as the corresponding audio display, and the LEDs 163a and 163b in the turned-off state function as the non-corresponding audio display. As with the structure shown in FIG. 8A, while looking at an image on the display 52, the user can look and check whether the LED 163a to 163c positioned below the display 52 are turned on or off, and thereby determine whether the audio currently being output corresponds to the image that he/she is looking at.

In the above-described structure, the LEDs 163a to 163c are turned on to function as the corresponding audio display, and are turned off to function as the non-corresponding audio display. However, it is not limited to such as long as the corresponding audio display and the non-corresponding audio display are visually distinguishable. For example, the lamps may be flickered to function as the corresponding audio display, and turned off to function as the non-corresponding audio display. Also, it is acceptable to have a structure for distinguishing between the corresponding audio display and non-corresponding audio display with use of luminescent colors. For example, it is possible to include a light emitter that is switchable between red, green, and blue luminescent colors. Then, the audio guides may be associated with the luminescent colors, and the luminescent colors may be switched from one color to another for each audio guide. Specifically, in a case where the audio key 22a is associated with a red luminescent color, the light emitter may emit red light when the audio key 22a is used for a touch input.

By knowing a correspondence between the luminescent colors and the audio guides in advance, the user can understand, for example, that when the red light is turned on, the audio guide currently being output corresponds to the left-view image. In other words, the user can understand that the audio guide currently being output does not correspond to the front-view or the right-view images. Here, the display 52 is a part of the display area of the operation display part 5, and the LEDs 163a to 163c are included in a remaining part of the display area thereof.

In an example shown in FIG. 8A, the non-corresponding audio display is indicated by turning off the message. However, it is not limited to such. For example, it is possible to adopt a symbol to indicate the non-corresponding audio display. Specifically, it is possible to use a symbol "x" to indicate the non-corresponding audio display.

<Embodiment 2>

Embodiment 1 describes an example of a structure for outputting an audio guide when a user uses an audio key for a touch input. The present embodiment is different from Embodiment 1 with respect to the following point. In the present embodiment, the location (i.e., one of the left, front, and right) of a user with respect to the copier 1 is detected. Then, an audio guide corresponding to the detected location (i.e., an audio guide explaining the image the user is looking at), is automatically output. In the present embodiment, descriptions of structures that are the same as those in Embodiment 1 are omitted to avoid the repetition. Also, components that are the same as those in Embodiment 1 are referred to by the same reference numbers.

FIG. 9 shows a display example of left-view, front-view, and right-view images 221a to 221c that are simultaneously displayed on the display 52. Each of the left-view, front-view, and right-view images 221a to 221c shows how to clear a paper jam.

Specifically, the left-view image 221a shows how to clear a paper jam in an optional finisher located in the left side of the copier 1. The front-view image 221b shows how to clear a paper jam in the paper feeding cassette 41 of the printer 4. The right-view image 221c shows how to clear a paper jam in the printer 4. As with Embodiment 1, while an audio guide is being output, an image (221b in FIG. 9) corresponding to the audio guide displays a notification (223b in FIG. 9) as the corresponding audio display, and images (221a and 221c in FIG. 9) not corresponding to the audio guide show notifications (223a and 223c in FIG. 9) as the non-corresponding audio displays.

FIG. 9 shows a case where paper jams have occurred in the left, front, and right sides of the copier 1. Here, there may be a case where a paper jam occurs in a paper feeding cassette different from the paper feeding cassette 41 in the front of the copier 1. In view of such a case, a different image is prepared for each part in which a paper jam has occurred. In this way, when paper jams occur in different parts in the same side of the copier 1, images displayed for the parts are each different. Also, each of the left-view, front-view, and right-view images shows how to clear a paper jam in a predetermined part.

For example, assume that a paper jam occurs in a finisher. In this case, since the finisher is arranged on the left side of the copier 1, the user performs operations to clear the paper jam from the left side of the copier 1. Accordingly, the user can most easily look at the left-view image 221a during the operations. For this reason, when a paper jam occurs in the finisher, the left-view image 221a shows how to clear the paper jam.

In the similar manner, if a paper jam occurs in the paper feeding cassette 41, the front-view image 221b shows how to clear the paper jam because the user needs to pull the paper feeding cassette 41 toward him/her. Also, if a paper jam occurs inside the copier 1, the right-view image 221c shows how to clear the paper jam because the user needs to open and close the right cover 91.

As with Embodiment 1, audio guide data is stored in advance such that each image is associated with an audio guide explaining the image. Also, the audio guide data is read and output via the speaker 54.

In the present embodiment, the human body detector 6 detects a location in which a user is present, and an audio guide to be output is selected in accordance with the detected location. Specifically, assume that a user is present within the range of the angle α (see FIG. 1) that is a range in which the left-view image 221a is visible. In this case, an audio guide explaining a content (how to clear the jam in this example) of the left-view image 221a is selected. Similarly, when the user is present within the range of the angle β (see FIG. 1) that is a range in which the front-view image 221b is visible, an audio guide that explains a content corresponding to the front-view image 221b is selected. Also, when the user is present within the range of the angle γ (see FIG. 1) that is a range in which the right-view image 221c is visible, an audio guide that explains a content corresponding to the right-view image 221c is selected.

Such a structure is adopted for the following reason. Assume that the user is present in the range of the angle α and looking at the display 52. In this case, the image the user is looking at is presumably the left-view image 221a. Therefore, by outputting an audio guide that explains the left-view image 221a, the user can perform operations to clear a paper jam while looking at the image that shows how to clear the paper jam and listening to the audio guide that explains how to clear the paper jam. This improves operability for the user. Similarly, in a case where the user is present within the range of the angle β or the angle γ, an audio guide corresponding to an image visible from a location (i.e., angle β or γ) in which the user is present is selected.

Figure 10:
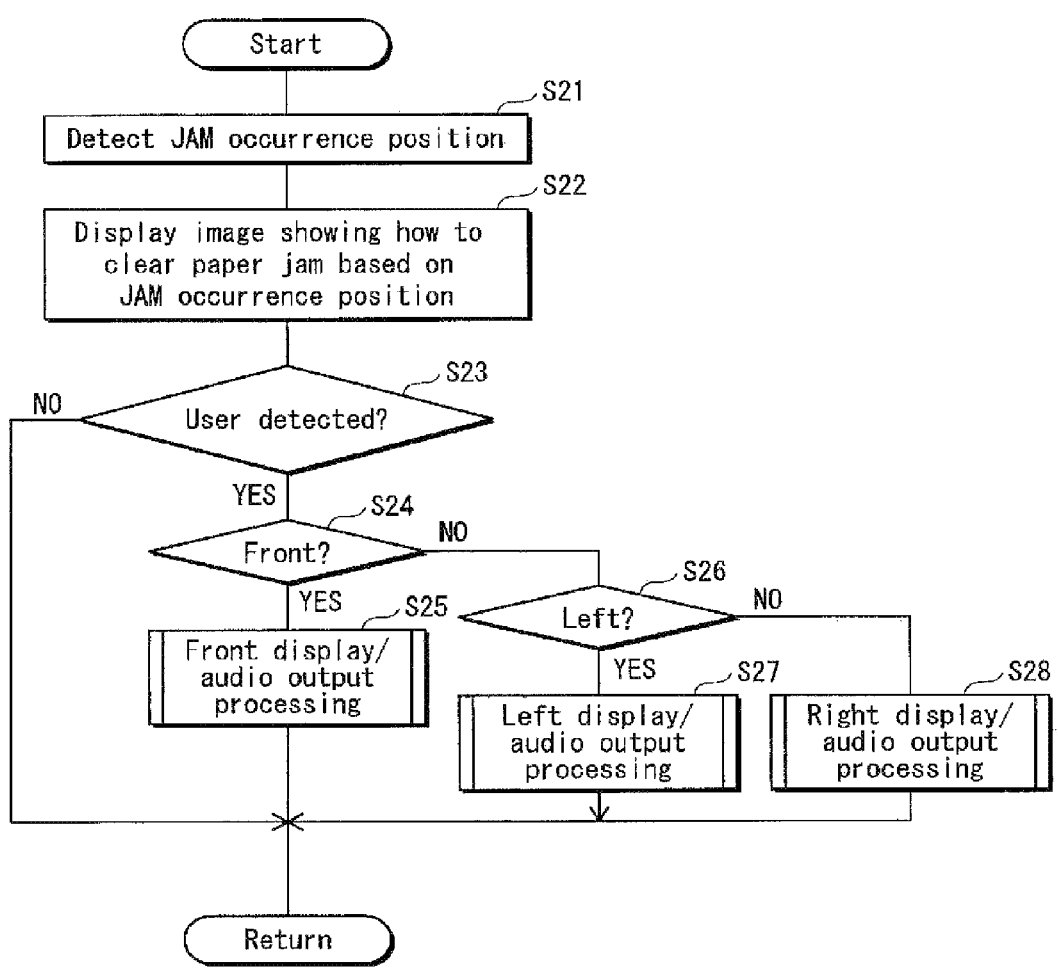
FIG. 10 is a flowchart showing a control over an image display and an audio guide output, upon detection of a paper jam.

FIG. 10 is a flowchart showing a control over an image display and an audio guide output upon detection of a paper jam. The control processing is performed by the operation controller 55, and is started each time there is a call from a main routine (not shown).

As shown in FIG. 10, the operation controller 55 detects a position where a paper jam has occurred (step S21). Based on the detected position, the operation controller 55 causes the display 52 to display an image showing how to clear the paper jam (step S22). For example, the image on the display 52 may be one of the images shown in FIG. 9.

The operation controller 55 then judges whether or not a user is present in the vicinity of the copier 1 (step S23). The judgment is performed based on a detection result of the human body detector 6 as to whether the presence of a user has been detected. When judging that the presence of the user has not been detected ("NO" in step S23), the operation controller 55 determines that the user is not yet present in the vicinity of the copier 1 to clear the paper jam, and returns to the main routine. In this case, although the image for clearing the paper jam is displayed, the audio guide is not output.

When judging that the presence of the user has been detected ("YES" in step S23), and further judging that the user is located in the front direction from among the right, front, and left directions ("YES" in step S24), the operation controller 55 performs display/audio output processing for the front direction (step S25), and returns to the main routine. When judging that the user is located in the left direction ("NO" in step 24 and "YES" in step S26), the operation controller 55 performs display/audio output processing for the left direction (step S27) and returns to the main routine. When judging that the user is located in the right direction ("NO" in step 26), the operation controller 55 performs display/audio output processing for the right direction (step S28) and returns to the main routine. The following describes (i) processing for the front direction (hereinafter, "front display/audio output processing"), (ii) processing for the left direction (hereinafter, "front display/audio output processing"), and (iii) processing for the right direction (hereinafter, "right display/audio output processing") in the stated order.

Figure 11:
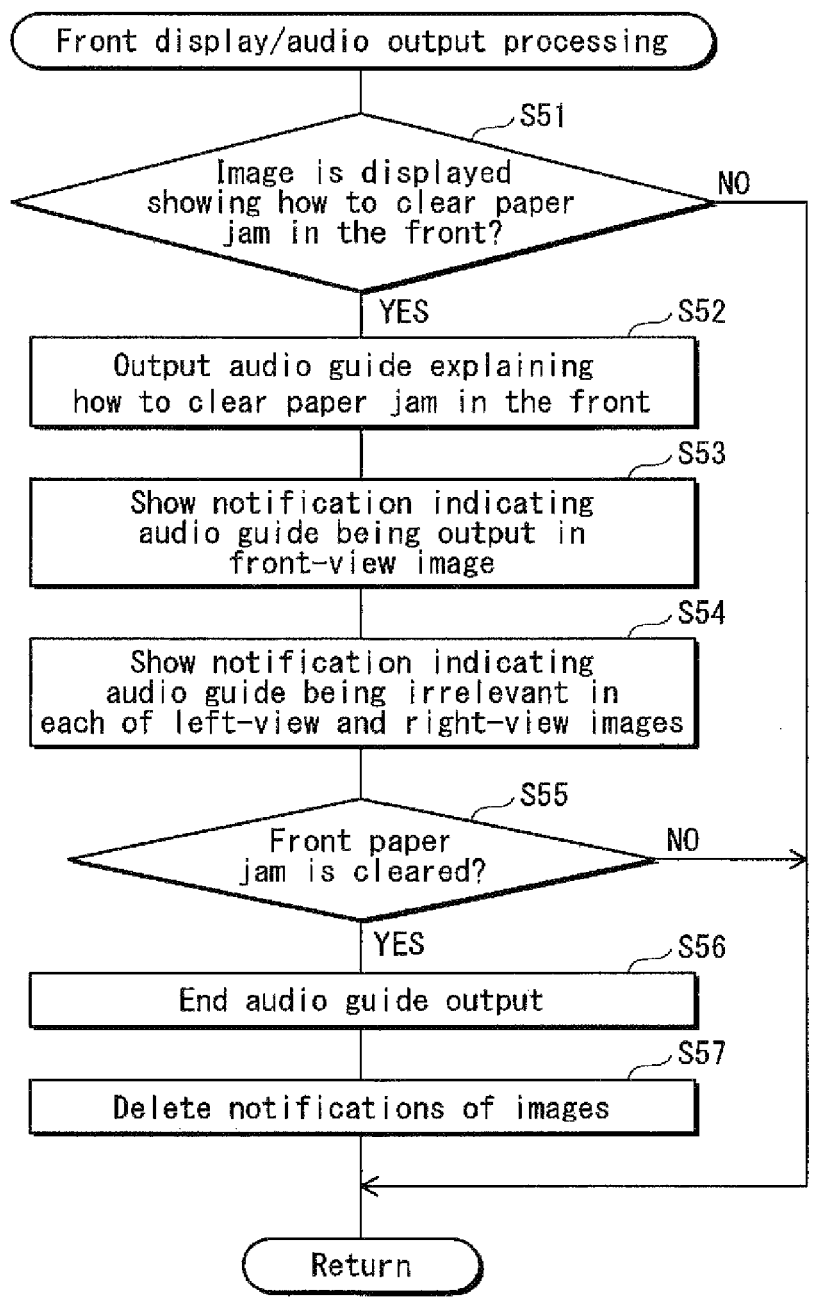
FIG. 11 is a flowchart showing a subroutine of display/audio output processing for a front direction.

FIG. 11 is a flowchart showing a subroutine of the front display/audio processing. As shown in FIG. 11, the operation controller 55 judges whether or not an image (221b in FIG. 9, for example) showing how to clear a paper jam is displayed as a front-view image (step S51).

Here, the image is assumed to be displayed ("YES" in step S51). The operation controller 55 selects, from audio guides for clearing paper jams, an audio guide corresponding to the front-view image and outputs the audio guide (step S52). Specifically, audio guide data is stored in advance such that each image is associated with an audio guide that explains the image, as described above. The operation controller 55 selects an audio guide corresponding to the image 221b from among the audio guides, reads audio guide data corresponding to the selected audio guide, and outputs the audio guide pertaining to the read data.

This enables a user in front of the copier 1 (i.e., apparatus) to perform operations to clear the paper jam while looking at the image 221b showing how to clear the paper jam from the front direction, and listening to the audio guide explaining how to clear the paper jam.

Then, the operation controller 55 shows, in the front-view image, a notification (corresponding audio display) indicating that the audio guide is being output (step S53), and further shows, in each of the left-view and right-view images, a notification (non-corresponding audio display) indicating that the audio guide currently being output is irrelevant (step S54). These displays are displayed in the same manner as Embodiment 1.

Subsequently, the operation controller 55 judges whether or not the paper jam detected in front of the copier 1 has been cleared (step S55). When judging that the paper jam has not been cleared ("NO" in step S55), the operation controller 55 returns to the main routine. In this case, since the paper j am is not yet cleared, steps S51 to S55 in the front display/audio output processing need to be performed again after one loop of the routine has been performed. The above-described processing steps are repeated until the jam is cleared. When judging that the jam detected in front of the copier 1 has been cleared ("YES" in step S55), the operation controller 55 finishes outputting the audio guide (step S56), deletes the notifications of the respective images (step S57), and returns to the main routine.

Assume here that after the paper jam detected in front of the copier 1 has been cleared, the processing for a paper jam is called and performed again. In this case, if a user is located within the range of the front direction, the user is detected by the human body detector 6. However, since the paper jam detected in front of the copier 1 has already been cleared, an image for clearing the paper jam in front of the copier 1 is not displayed (step S22). As a result, it is judged to be "NO" in step S51, and processing steps after step S52, namely processing steps for outputting audio and notifications, are not performed. The same applies to the left display/audio output processing and the right display/audio output processing. This means that even though three images each for explaining how to clear a paper jam are simultaneously displayed in the beginning, the images are deleted one by one in a manner that when a paper jam is cleared, an image corresponding to the paper jam is deleted. When all of the paper jams are cleared in the above-described manner, an audio guide is not output even though a user is detected.

Figure 12:
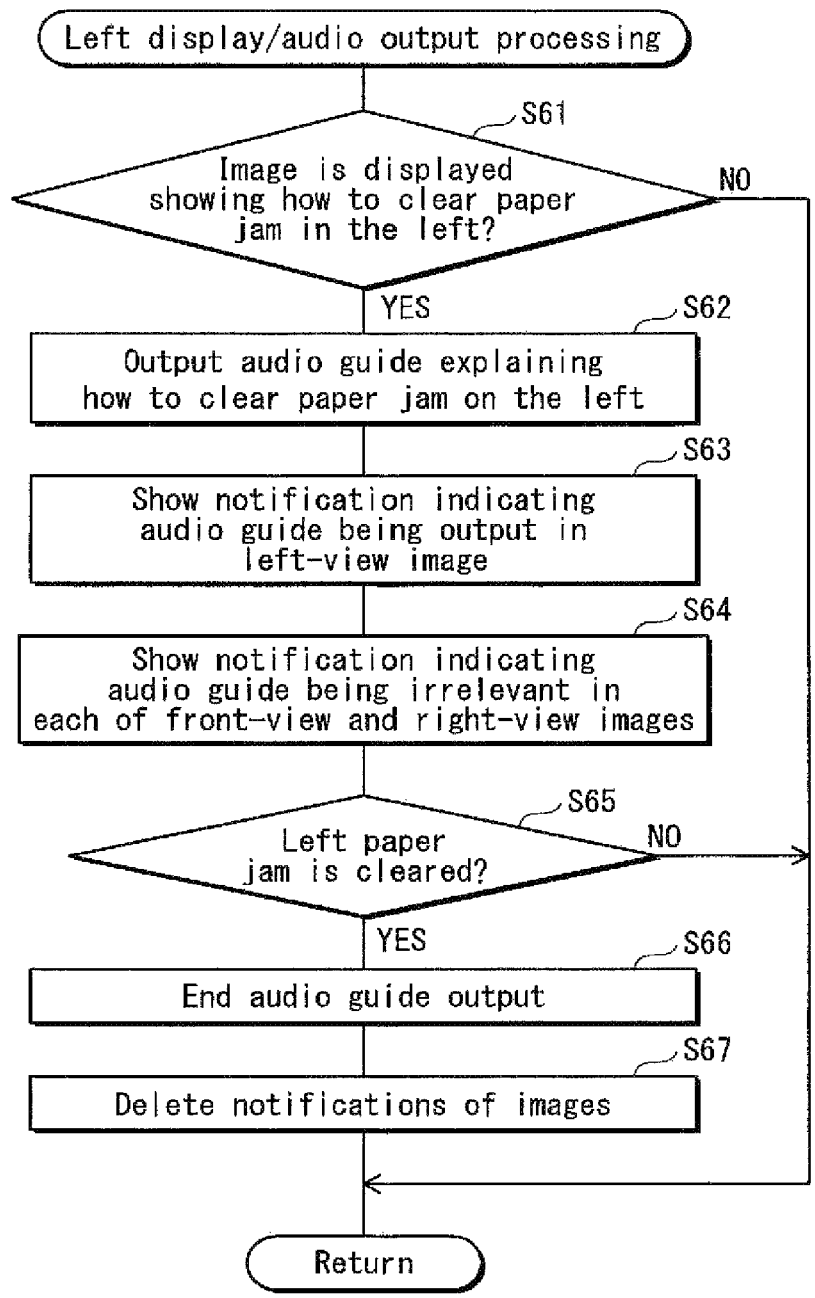
FIG. 12 is a flowchart showing a subroutine of display/audio output processing for a left direction.

FIG. 12 is a flowchart showing a subroutine of the left display/audio output processing. As shown in FIG. 12, the operation controller 55 judges whether or not an image (221a in FIG. 9, for example) showing how to clear a paper jam is displayed as a left-view image (step S61).

Here, the image is assumed to be displayed ("YES" in step S61). The operation controller 55 selects, from audio guides for clearing paper jams, an audio guide corresponding to the left-view image and outputs the audio guide (step S62). This enables a user on the left side of the copier 1 to perform operations to clear the paper jam while looking at the image showing how to clear the paper j am from the left side, and listening to the audio guide explaining how to clear the paper jam.

Then, the operation controller 55 shows, in the left-view image, a notification (corresponding audio display) indicating that the audio guide is being output (step S63), and further shows, in each of the front-view and right-view images, a notification (non-corresponding audio display) indicating that the audio guide currently being output is irrelevant (step S64). When judging that the jam detected on the left side of the copier 1 has been cleared ("YES" in step S65), the operation controller 55 finishes outputting the audio guide (step S66), deletes the notifications of the respective images (step S67), and returns to the main routine.

Figure 13:
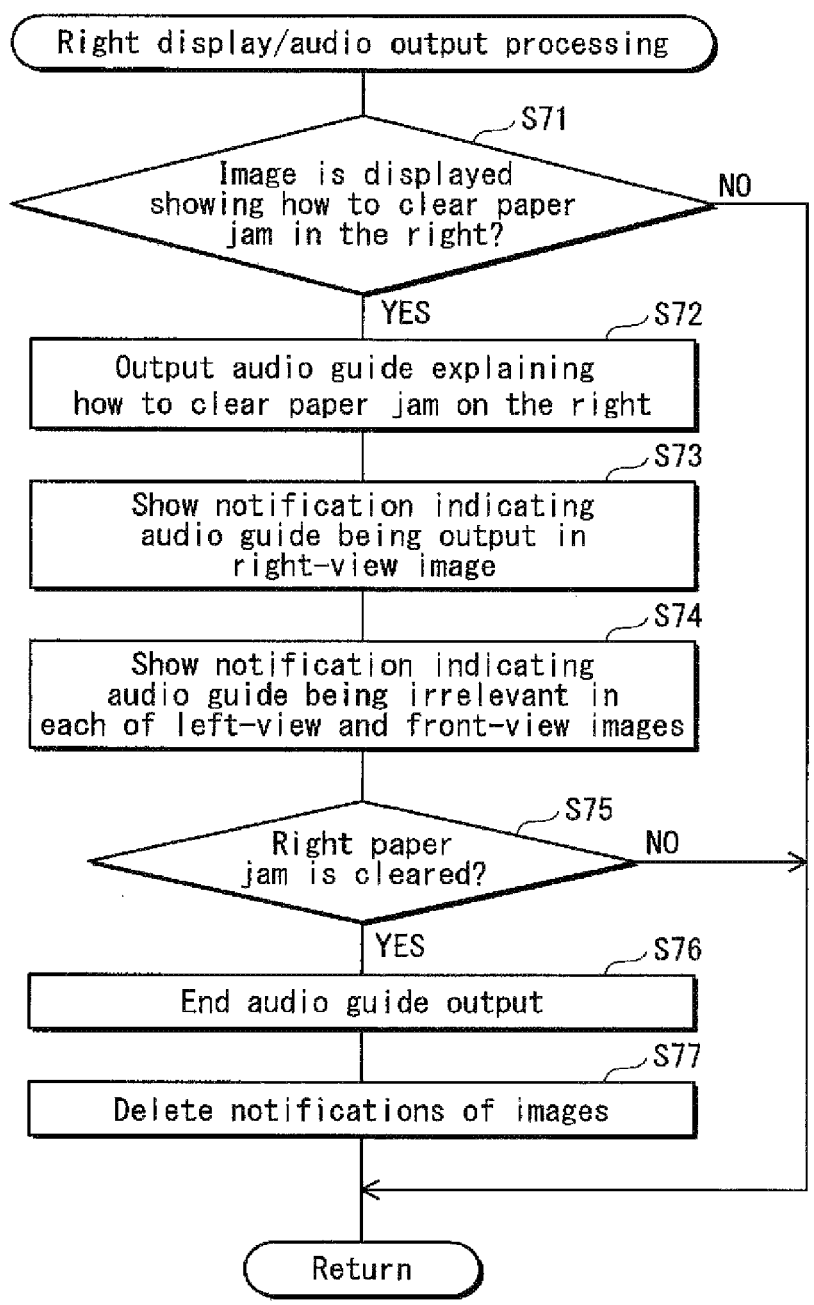
FIG. 13 is a flowchart showing a subroutine of display/audio output processing for a right direction.

FIG. 13 is a flowchart showing a subroutine of the right display/audio output processing. As shown in FIG. 13, the operation controller 55 judges whether or not an image (221c in FIG. 9, for example) showing how to clear a paper jam is displayed as a right-view image (step S71).

Here, the image is assumed to be displayed ("YES" in step S71). The operation controller 55 selects, from audio guides for clearing paper jams, an audio guide corresponding to the right-view image and outputs the audio guide (step S72). This enables a user on the right side of the copier 1 to perform operations to clear the paper jam while looking at the image showing how to clear the paper jam from the right side, and listening to the audio guide explaining how to clear the paper jam.

Then, the operation controller 55 shows, in the right-view image, a notification (corresponding audio display) indicating that the audio guide is being output (step S73), and further shows, in each of the left-view and front-view images, a notification (non-corresponding audio display) indicating that the audio guide currently being output is irrelevant (step S74). When judging that the jam detected on the right side of the copier 1 has been cleared ("YES" in step S75), the operation controller 55 finishes outputting the audio guide (step S76), deletes the notifications of the respective images (step S77), and returns to the main routine.

As described above, in the present embodiment, the location of a user with respect to the copier 1 is detected, and an audio guide corresponding to an image visible from the detected location is automatically selected and output. Therefore, it is not necessary for the user to perform a key operation for instructing audio output. As a result, even if the user forgets the key operation, the user can still perform operations for clearing a paper jam while listening to an audio guide that explains an image the user is looking at. This improves operability.

Although it is described above that the notifications are displayed, the notifications do not necessarily need to be displayed. Also, although an image showing how to clear a paper jam and an audio guide corresponding to the image are exemplarily shown above, it is not limited to such. For example, assume that the images 21a to 21c (see FIG. 2) in Embodiment 1 are simultaneously displayed. In this case, if the user is located in front of the copier 1, an audio guide corresponding to the image 21b (i.e., audio guide that explains the image 21b) may be automatically output. If the user moves from the front to the left side of the copier 1, the audio guide may be automatically switched to an audio guide corresponding to the image 21a and output. This structure eliminates the necessity of using an audio key for a touch input. Also, the number of images does not always need to be three. Instead, a plurality of images (e.g., left-view and right-view images) may be provided, and audio guides corresponding to the left-view and right-view images may be automatically switched and output.

<Examples of Other Audio Output Control>

In the above-described embodiment, the volume of each audio guide is not specified. However, the volume may be controlled in the following manner. Assume that paper jams occur in three different parts of the copier 1, and that three images that each show how to clear a corresponding paper jam are simultaneously displayed. In this case, a first audio guide corresponding to an image visible from a location in which a user is present may be output at a first volume. Then, after the first round of playback of the first audio guide, second and third audio guides corresponding to the other two images may be sequentially output at a second volume that is lower than the first volume.

Specifically, in a case where the user is located in front of the copier 1, an audio guide for the front (hereinafter, front audio guide) is output first. Then, audio guides for the left and right directions (hereinafter, left audio guide and right audio guide, respectively) are sequentially output at a volume lower than the volume of the front audio guide. For example, in a case where each audio guide lasts approximately 15 seconds, total time from the start of output of the front audio guide to the end of output of the right audio guide is approximately 45 seconds.

This allows the user, while listening to the front audio guide to clear the paper jam in front of the copier 1, (i) to understand that the other paper jams, which have occurred in parts other than the front of the copier 1, have not yet been cleared, and (ii) to learn how to clear the other paper jams. Furthermore, the audio guides for the other paper jams are output at a volume lower than the front audio guide. Therefore, it is easy to distinguish between the front audio guide for the paper jam that the user is currently intending to clear and the audio guides for the other paper jams that are to be subsequently cleared. Furthermore, because of the lower volume, the audio guides do not interrupt the user's current operation to clear the paper jam.

The above-described volume control is performed during display/audio output processing. For example, in the front display/audio output processing shown in FIG. 11, the volume control is performed between steps S51 and S52.

Figure 14:
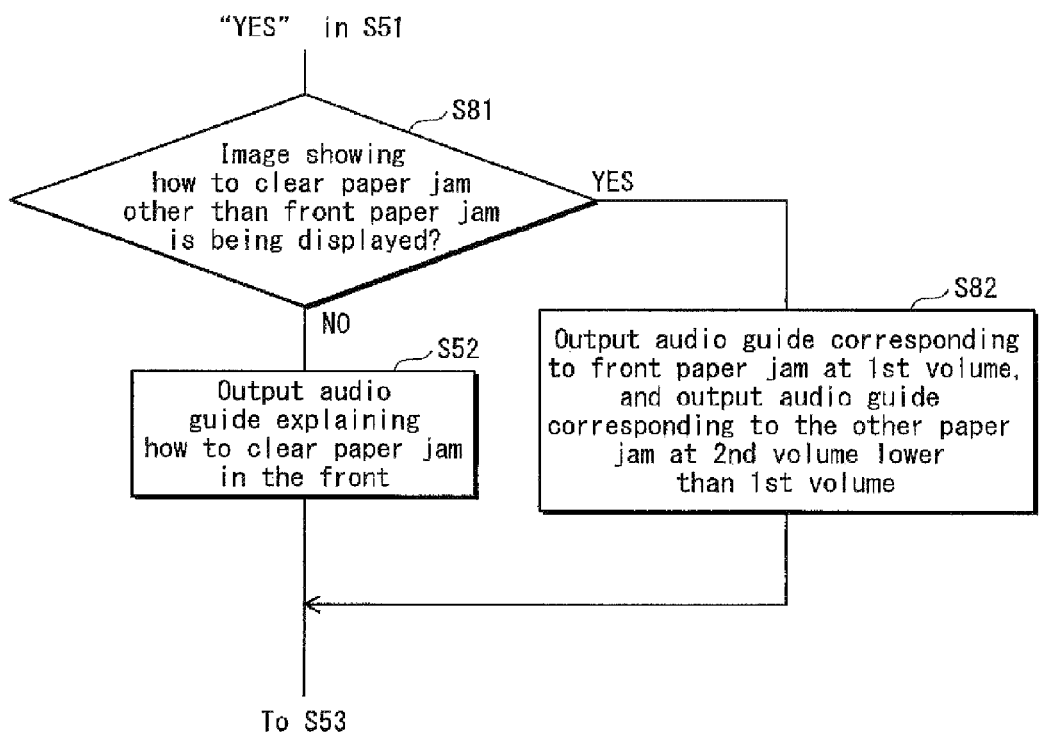
FIG. 14 is a flowchart partially showing display/audio output processing including a volume control, for a front direction.

FIG. 14 is a flowchart partially showing the front display/audio output processing that includes a volume control. The flowchart only shows processing steps that are different from those shown in FIG. 11.

In FIG. 14, when judging "YES" in step S51, the operation controller 55 judges whether or not an image showing how to clear a paper jam in a part other than the front of the copier 1 is being displayed (step S81). When judging that the image is not being displayed ("NO" in step S81), the operation controller 55 moves on to step S52. In this case, the same processing as above is performed. When judging that the image is being displayed ("YES" in step S81), the operation controller 55 causes an audio guide for clearing a paper jam corresponding to the front-view image to be output at a first volume, and thereafter causes the other one or two audio guides that explain how to clear a paper jam (left/right) corresponding to one or two images to be sequentially output at a second volume that is lower than the first volume.

With the above-described structure, upon completion of the output of the front audio guide at the first volume, the output of either the left or right audio guide is immediately started at the second volume that is lower than the first volume. After the audio control is started in step S82, the processing of step S53 onward is performed.

The above describes a structure in the case of including an audio control in the front display/audio output processing. However, the same applies to the case of including the audio control in each of the left display/audio output processing and the right display/audio output processing. That is, processing steps similar to steps S81 and S82 are included between steps S61 and S62, and between steps S71 and S72.

For example, in the left display/audio output processing, an audio guide for clearing a paper jam (left direction) corresponding to the left-view image is output at the first volume.

Then, upon completion of the output of the audio guide, one or two audio guides for clearing a paper jam (front/right direction) are sequentially output.

Such an audio control further improves operability.

<Embodiment 3>

The present embodiment describes a structure in which, when a user causes an audio guide to be output by a touch input using an audio key while the copier 1 is in operation (e.g., copy operation), an audio guide having different frequency characteristics is output depending on whether an optional apparatus is mounted on the copier 1.

Such a structure is employed so that the user can more easily listen to the audio guide.

Generally, the frequency of an audio guide is determined in a manner that a frequency band of the audio guide does not overlap with that of an operation noise of the copier 1 as much as possible, so as to prevent the audio guide from being muffled by a drive noise (operation noise) produced by the copier 1 in operation.

The frequency of the audio guide is determined in the above-described manner on the assumption that the copier 1 is used singly. However, in recent years, copiers on which an optional apparatus such as a finisher or a large-capacity feeding apparatus is mountable have been prevalent. The frequency band of the drive noise of such an optional apparatus is usually different from that of another optional apparatus or that of the copier 1. This means that the drive noise of the copier 1 changes depending on the condition of the copier 1, or to be more specific, depending on whether or not an optional apparatus is mounted on the copier 1.

Therefore, in a system structure where an optional apparatus is mountable, the following problem may occur although the frequency of an audio guide is appropriately determined for the copier 1. That is, a peak frequency (component) in the frequency band of the drive noise of the copier 1, which is a frequency having the highest strength level (dB) in the frequency band of the drive noise, may approach a peak frequency in the frequency waveform (distribution) of the audio guide, depending on the state of the copier 1 on which at least one optional apparatus is mounted. In this case, the audio guide may be muffled by the drive noise, resulting in the user having difficulties in listening to the audio guide.

In view of such a problem, the present embodiment provides a structure for, when an optional apparatus is mounted on the copier 1, outputting data of an audio guide whose peak frequency is in a frequency band away from (different from) a peak frequency in the frequency waveform of a drive noise produced from the copier 1 having the optional apparatus mounted thereon.

In the above-described structure, although the content of an audio guide, for example, the words in the explanation provided by the audio guide such as "when a Single-side Reading and Double-side Printing tab is selected . . . " are the same, the tone of the audio guide is changed by changing the frequency thereof in accordance with an optional apparatus mounted on the copier 1.

FIG. 15A shows an example of a pattern information table 301 indicating audio pattern information in which an audio pattern, an operation mode, a direction, and a mounting option (OP) are associated with each other.

As shown in FIG. 15A, each of audio patterns A, C, and E indicates, when a corresponding apparatus in the "mounting option OP" column is mounted on the copier 1 and an audio guide is output while the copier 1 and the optional apparatus are in operation, the identification number of a frequency pattern of an audio guide corresponding to the combination of the optional apparatus and the copier 1. The frequency characteristics of the audio pattern of each identification number are shown in a frequency characteristics table 302 in FIG. 15B. Note that the numeral values shown in the frequency characteristics table 302 are merely exemplary and different from actual values.

Assume, for example, that a finisher is mounted on the copier 1, and an audio guide is output while the copier 1 and the finisher are in operation. In this case, as shown in the pattern information table 301 in FIG. 15A, data stored in advance as an audio guide of the audio pattern A that corresponds to the combination of the copier 1 and the finisher is read and output. Note that the inner finisher indicated in the "mounting option OP" column refers to a compact finisher that fits in the space 9 in FIG. 1.

Audio patterns B, D, and F indicate the identification numbers of audio patterns that each correspond to the left, front, and right directions, respectively, when an optional apparatus is not mounted on the copier 1. A different audio pattern is provided for each of the directions when an optional apparatus is not mounted on the copier 1, because of the following reasons.

Although an optional apparatus is not mounted, it is unlikely that the drive noise inside the copier 1 is transmitted equally in all directions in the vicinity of the copier 1. Therefore, the drive noise of the copier 1 may sound different to a user depending on whether he/she is located in the left, front, or right direction. For example, the following situation may occur depending on the noise insulation performance of the copier 1. Assume that a fixer is arranged on the right side of the copier 1. In this case, the drive noise of the fixer is audible on the right side, but is hardly audible on the front or left side of the copier 1. Also, there may be a situation where a noise of conveying sheets of paper is audible on the front side of the copier 1, but not on the left side thereof, when the sheets of paper in the paper feeding cassette are being fed.

In view of the above-described situations, each of the left, front, and right sides of the copier 1 is associated with an audio guide whose peak in the frequency characteristics is different from the peak of the frequency waveform of a transmitted drive noise, so as to make the audio guide less likely to be muffled by the drive noise.

Each of the audio patterns A to F indicates a frequency that is set in advance in the following manner. First, for each of the cases where an optional apparatus is mounted and not mounted on the copier 1, an experiment is conducted to measure the frequency of a drive noise transmitted to each of the users who are located in the left, front, and right directions thereof (range of the viewing angles α to γ). Then, a frequency that has a peak in a frequency band different from the frequency of each drive noise is set, so that the frequency does not overlap with the peaks included in the measured frequencies. Hereinafter, the copier 1 on which an optional apparatus is mounted is also simply referred to as "copier".

An audio guide indicated by the pattern G where the copier is in a standby mode (i.e., not in operation) corresponds to the audio guide in Embodiments 1 and 2.

Figure 16:
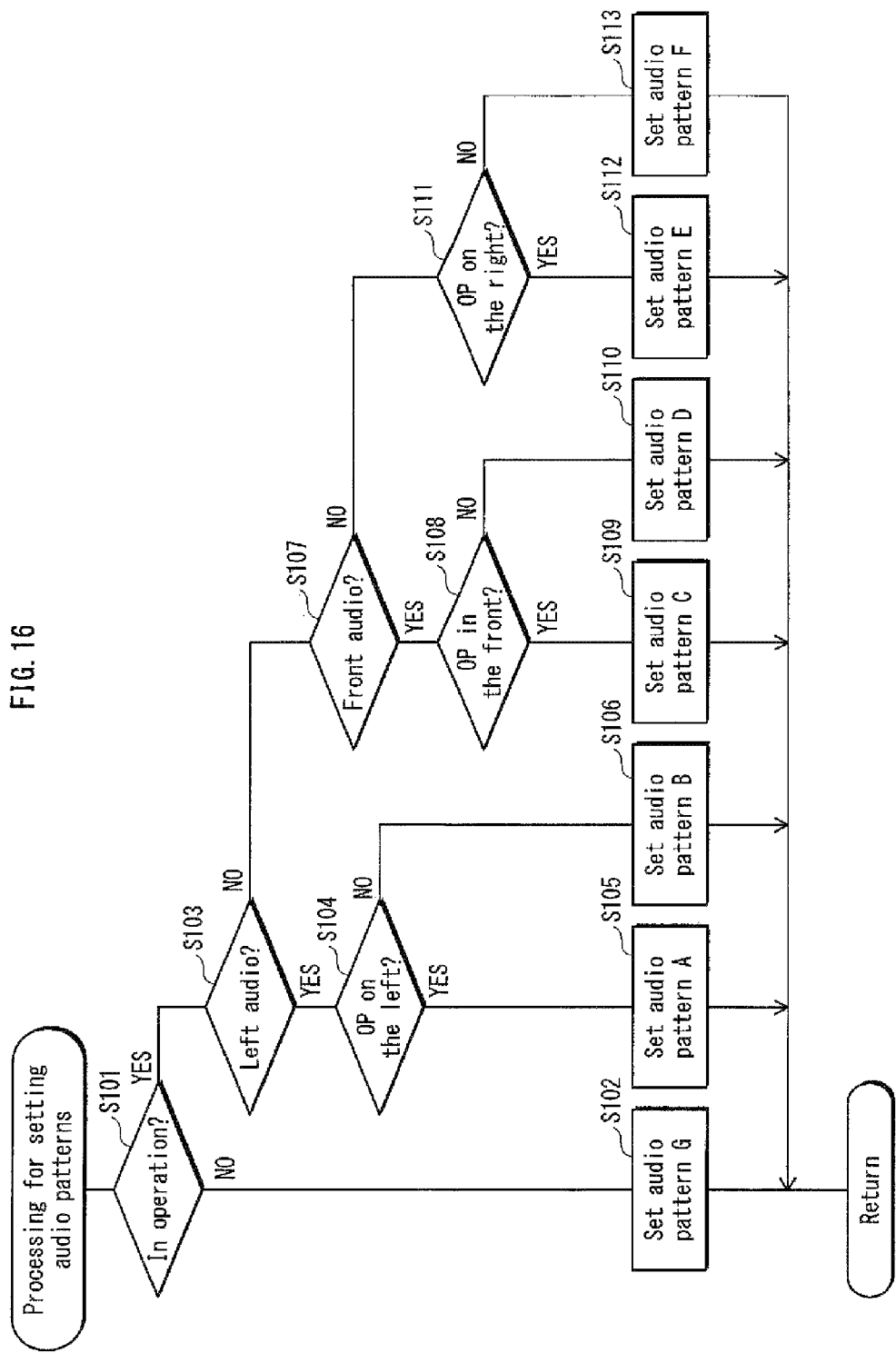
FIG. 16 is a flowchart showing processing for setting audio patterns.

FIG. 16 is a flowchart showing processing for setting audio patterns. The processing is performed immediately before the operation controller 55 outputs an audio guide.

As shown in FIG. 16, the operation controller 55 judges whether or not the copier is in operation (step S101). The state of the copier being in operation refers to a state where, for example, a drive motor in the copier is rotating and a job such as a copy job or a scan job is being executed.

When judging that the copier is not in operation ("NO" in step S101), the operation controller 55 sets the audio pattern G with reference to the pattern information table 301 (step S102), and returns to the main routine. The setting of the audio pattern is performed by writing an identification number (G in this example) for specifying a pattern into a storage (not shown). When an identification number has already been set, the identification number is overwritten with a new identification number to be stored. When outputting an audio guide, the operation controller 55 reads the identification number of an audio pattern that is set, further reads data of an audio guide corresponding to the identification number, and outputs the data via the speaker 54.

When judging that the copier is in operation ("YES" in step S101), the operation controller 55 judges whether or not an audio guide to be output corresponds to a left-view image (step S103). Specifically, in a case where an audio key is used for a touch input as described above, the operation controller 55 judges whether or not an image displayed by the touch input of the audio key is a left-view image. Also, in a case where the copier is configured to detect a user, the operation controller 55 judges whether or not the detected direction in which the user is located is left. This judgment method is also used in the following cases where judgment is made as to whether or not an audio guide corresponds to a front-view image or a right-view image.

When judging that the audio guide corresponds to the left-view image ("YES" in step S103), the operation controller 55 judges whether or not an optional apparatus (e.g., finisher) is mounted on the left side of the copier (step S104).

When judging that an optional apparatus is mounted ("YES" in step 5104), the operation controller 55 sets the audio pattern A with reference to the pattern information table 301 (step S105), and returns to the main routine. When judging that an optional apparatus is not mounted ("NO" in step S104), the operation controller 55 sets the audio pattern B with reference to the pattern information table 301 (step S106), and returns to the main routine.

When judging that the audio guide to be output corresponds to a front-view image, and not to a left-view image ("NO" in step S103, and "YES" in step S107), the operation controller 55 judges whether or not an optional apparatus (e.g., inner finisher) is mounted in front of the copier (step S108).

When judging that an optional apparatus is mounted ("YES" in step S108), the operation controller 55 sets the audio pattern C with reference to the pattern information table 301 (step S109), and returns to the main routine. When judging that an optional apparatus is not mounted ("NO" in step S108), the operation controller 55 sets the audio pattern D with reference to the pattern information table 301 (step S110), and returns to the main routine.

When judging that the audio guide to be output corresponds to a right-view image, and not to a front-view image ("NO" in step S107), the operation controller 55 judges whether or not an optional apparatus (e.g., large-capacity feeding apparatus) is mounted on the right side of the copier (step S111).

When judging that an optional apparatus is mounted ("YES" in step S111), the operation controller 55 sets the audio pattern E with reference to the pattern information table 301 (step S112), and returns to the main routine. When judging that an optional apparatus is not mounted ("NO" in step S111), the operation controller 55 sets the audio pattern F with reference to the pattern information table 301 (step S113), and returns to the main routine.

As described above, in the present embodiment, when an audio guide is output while the copier is in operation, an audio guide is output having different frequency characteristics depending on whether or not an optional apparatus is mounted on the copier 1. Therefore, the user can more easily listen to an audio guide regardless of whether or not an optional apparatus is mounted on the copier, resulting in the operability being improved.

In the above-described embodiment, the frequency of an audio guide is determined for each optional apparatus in the following manner. That is, when an optional apparatus is mounted on the copier, the peak frequency of an audio guide is in a frequency band different from a peak frequency in the frequency waveform of a drive noise produced from the copier having the optional apparatus mounted thereon. However, it is not limited to such. The frequency of an audio guide may be determined in a different manner, as long as the audio guide is not muffled by a drive noise of the copier. For example, a so-called "active noise control" method may be used to generate, for each optional apparatus, audio data including an anti-phase frequency that cancels the drive noise of the copier having the optional apparatus mounted thereon. This reduces the drive noise, making it easy for the user to listen to the audio guide.

The present invention is not limited to the image forming apparatus. For example, it may be a method for showing a notification, or a method for outputting an audio guide. Furthermore, it may be a program for causing a computer to execute such a method. Also a program pertaining to the present invention may be recorded on a computer readable recording medium. For example, such a computer readable recording medium may be: a magnetic disk such as a magnetic tape or a flexible disk; an optical recording medium such as a DVD-ROM, a DVD-RAM, a CD-ROM, a CD-R, an MO, or a PD; a flash memory type recording medium; or the like. The present invention may be manufactured or transferred in the form of such a recording medium, or may be transmitted or distributed in the form of a program via any types of wired or unwired networks including the Internet, broadcast, a telecommunication line, or a satellite communication.

<Modifications>

Although the present invention has been described based on the above-described embodiments, the present invention is of course not limited to such. For example, the following modifications are possible.

(1) In the above-described embodiments, three images are simultaneously displayed on the display as the multi-view function. However, it is possible to simultaneously show a plurality of images other than three. For example, the present invention may include a dual-view function in which two images are simultaneously displayed. Also, in the above-described embodiments, the ranges of the viewing angles α and β are arranged adjacent to each other (in series). However, it is not limited to such. For example, a range in which no image is visible may be provided between the viewing angles α and β.

(2) In the above-described embodiments, an image forming apparatus pertaining to the present invention is applied to a color digital copier. However, it is not limited to such. The present invention may be any image forming apparatus as long as it includes the operation display part 5, regardless of whether a color image or a monochrome image is formed. For example, the present invention may be a printer, a scanner, a FAX, an MFP (Multiple Function Peripheral) or the like.

The present invention may be any combination of the above-described embodiments and modifications.

<Conclusion>

The above-described embodiments and modifications indicate one aspect for solving the problem described in the section of (2) Related Art, and these embodiments and modifications are summarized as follows.

The present invention provides an image forming apparatus comprising: an operation part having a display area and operable to receive an input from a user; a first display part operable to display, in a part of the display area, (i) a first image to be visible only from a range of a first viewing angle and (ii) a second image to be visible only from a range of a second viewing angle that does not overlap with the range of the first viewing angle; an audio output part operable to output an audio explaining the first image; and a second display part operable, while the audio explaining the first image is being output, to display, in a remaining part of the display area, a notification indicating that the audio explaining the first image does not correspond to the second image, such that the notification is visible from the range of the second viewing angle.

With the above-described structure, the notification is displayed indicating that the audio does not correspond to the second image while the audio explaining the first image is being output. By looking at the notification, the user understands that the audio does not correspond to an image that he/she is looking at. This prevents the user from getting confused whether or not the audio corresponds to an image that he/she is looking at, thus improving operability.

Also, the audio output part may be further operable to output an audio explaining the second image, and to output one of (i) the audio explaining the first image and (ii) the audio explaining the second image by switching therebetween, and the second display part may be further operable, while the audio explaining the second image is being output, to display, in the remaining part of the display, a notification indicating that the audio explaining the second image does not correspond to the first image, such that the notification is visible from the range of the first viewing angle.

With the above-described structure, the user who is looking at the first image understands that the audio explaining the second image and currently being output does not correspond to the first image that he/she is looking at, thus further improving operability.

Also, the display area may be a screen, and the second display part may display (i) the notification indicating that the audio explaining the first image does not correspond to the second image in a manner that the notification is visible only from the range of the second viewing angle, while the audio explaining the first image is being output, and (ii) the notification indicating that the audio explaining the second image does not correspond to the first image in a manner that the notification is visible only from the range of the first viewing angle, while the audio explaining the second image is being output.

With the above-described structure, the notification, which indicates that the audio does not correspond to an image that the user is looking at, is displayed in the screen the user is looking at, resulting in the user being more likely to notice the notification.

Also, while the image forming apparatus is in operation, the audio explaining the first image may have a peak frequency different from a peak frequency of a drive noise that is produced by the image forming apparatus in operation, and that is transmitted to a user in the range of the first viewing angle, and the audio explaining the second image may have a peak frequency different from a peak frequency of a drive noise that is produced by the image forming apparatus in operation, and that is transmitted to a user in the range of the second viewing angle.

With the above-described structure, the user easily listens to audio even when the audio is output while the apparatus is in operation. Therefore, the user can more easily perform operations.

Also, the display area may include first and second screens, the part of the display area may be the first screen, the remaining part of the display area may be the second screen, and the second display part may display, on the second screen, (i) a notification indicating that the audio explaining the first image corresponds to the first image and not to the second image, while the audio explaining the first image is being output, and (ii) a notification indicating that the audio explaining the second image corresponds to the second image and not to the first image, while the audio explaining the second image is being output.

Furthermore, the part of the display area may be a screen, the remaining part of the display area may include a first light-emitting element indicating whether or not the audio explaining the first image is being output, and a second light-emitting element indicating whether or not the audio explaining the second image is being output, and the second display part may turn on or flicker the first light-emitting element and turn off the second light-emitting element, while the audio explaining the first image is being output, and turn on or flicker the second light-emitting element and turn off the first light-emitting element, while the audio explaining the second image is output.

This enables the user to easily look at the notification indicating that the audio does not correspond to an image that the user is looking at.

Also, the present invention provides an image forming apparatus comprising: an operation part operable to receive an input from a user; a display part operable to display (i) a first image to be visible only from a range of a first viewing angle and (ii) a second image to be visible only from a range of a second viewing angle that does not overlap with the range of the first viewing angle; a detector operable to detect a location of the user with respect to the operation part; a selector operable to select an audio to be output based on the location detected by the detector, the audio to be output being one of an audio explaining the first image and an audio explaining the second image; and an audio output part operable to output the selected audio.

The above-described structure eliminates the necessity of the user performing a key operation for an audio output instruction. Instead, the audio explaining the first image may be output when the user moves to a location at which the first image is visible. This allows the user to perform operations while listening to the audio explaining the image that the user is looking at, thus improving operability.

Also, based on the location detected by the detector, the selector may select the audio explaining the first image when judging that the user is present in the range of the first viewing angle, and select the audio explaining the second image when judging that the user is present in the range of the second viewing angle.

In this way, the user can listen to the audio explaining the first image by moving into the range of the first viewing angle, and can listen to the audio explaining the second image by moving into the range of the second viewing angle, thus providing convenience to the user.

Furthermore, the audio output part may be further operable, after outputting the selected audio at a first volume, to output a non-selected audio at a second volume that is lower than the first volume, the non-selected audio being one of the audio explaining the first image and the audio explaining the second image.

The above-described structure achieves the following advantageous effects. For example, suppose that the user looks at the first image and then the second image to perform operations related to the first and second images. In this case, the user is guided through operations related to the first image by the audio explaining the first image, and also can listen in advance to the audio explaining operations that are related to the second image and that are to be performed after the operations related to the first image. Furthermore, the audio explaining the second image is lower than the audio explaining the first image, which avoids the user from getting confused whether or not the audio currently being output corresponds to the first image. This further improves operability.

Also, while the image forming apparatus is in operation, the audio explaining the first image may have a peak frequency different from a peak frequency of a drive noise that is produced by the image forming apparatus in operation, and that is transmitted to a user in the range of the first viewing angle, and the audio explaining the second image may have a peak frequency different from a peak frequency of a drive noise that is produced by the image forming apparatus in operation, and that is transmitted to a user in the range of the second viewing angle.

With the above-described structure, the user easily listens to audio even when the audio is output while the apparatus is in operation. Therefore, the user can more easily perform operations.

<Industrial Applicability>

The present invention is widely applicable to image forming apparatuses each having an operation display part.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus comprising:
an operation part having a display area and operable to receive an input from a user;
a first display part operable to simultaneously display, in a part of the display area, both: (i) a first image projected in a first direction so as to be visible only from a first range of viewing angles, and (ii) a second image projected in a second direction so as to be visible only from a second range of viewing angles that does not overlap with the first range of viewing angles;
an audio output part operable to output an audio explaining the first image; and
a second display part operable, while the audio explaining the first image is being output, to display, in a remaining part of the display area, a notification indicating that the audio explaining the first image does not correspond to the second image, such that the notification is visible from the second range of viewing angles.

2. The image forming apparatus of claim 1, wherein
the audio output part is further operable to output an audio explaining the second image, and to output one of (i) the audio explaining the first image and (ii) the audio explaining the second image by switching therebetween, and
the second display part is further operable, while the audio explaining the second image is being output, to display, in the remaining part of the display, a notification indicating that the audio explaining the second image does not correspond to the first image, such that the notification is visible from the first range of viewing angles.

3. The image forming apparatus of claim 2, wherein
the display area is a screen, and
the second display part displays (i) the notification indicating that the audio explaining the first image does not correspond to the second image in a manner that the notification is visible only from the second range of viewing angles, while the audio explaining the first image is being output, and (ii) the notification indicating that the audio explaining the second image does not correspond to the first image in a manner that the notification is visible only from the first range of viewing angles, while the audio explaining the second image is being output.

4. The image forming apparatus of claim 3, wherein
while the image forming apparatus is in operation,
the audio explaining the first image has a peak frequency different from a peak frequency of a drive noise that is produced by the image forming apparatus in operation, and that is transmitted to a user in the first range of viewing angles, and
the audio explaining the second image has a peak frequency different from a peak frequency of a drive noise that is produced by the image forming apparatus in operation, and that is transmitted to a user in the second range of viewing angles.

5. The image forming apparatus of claim 2, wherein
the display area includes first and second screens,
the part of the display area is the first screen,
the remaining part of the display area is the second screen, and
the second display part displays, on the second screen, (i) a notification indicating that the audio explaining the first image corresponds to the first image and not to the second image, while the audio explaining the first image is being output, and (ii) a notification indicating that the audio explaining the second image corresponds to the second image and not to the first image, while the audio explaining the second image is being output.

6. The image forming apparatus of claim 5, wherein
while the image forming apparatus is in operation,
the audio explaining the first image has a peak frequency different from a peak frequency of a drive noise that is produced by the image forming apparatus in operation, and that is transmitted to a user in the first range of viewing angles, and
the audio explaining the second image has a peak frequency different from a peak frequency of a drive noise that is produced by the image forming apparatus in operation, and that is transmitted to a user in the second range of viewing angles.

7. The image forming apparatus of claim 2, wherein
the part of the display area is a screen,
the remaining part of the display area includes a first light-emitting element indicating whether or not the audio explaining the first image is being output, and a second light-emitting element indicating whether or not the audio explaining the second image is being output, and
the second display part
turns on or flickers the first light-emitting element and turns off the second light-emitting element, while the audio explaining the first image is being output, and
turns on or flickers the second light-emitting element and turns off the first light-emitting element, while the audio explaining the second image is output.

8. The image forming apparatus of claim 7, wherein
while the image forming apparatus is in operation,
the audio explaining the first image has a peak frequency different from a peak frequency of a drive noise that is produced by the image forming apparatus in operation, and that is transmitted to a user in the first range of viewing angles, and
the audio explaining the second image has a peak frequency different from a peak frequency of a drive noise that is produced by the image forming apparatus in operation, and that is transmitted to a user in the second range of viewing angles.

9. The image forming apparatus of claim 2, wherein
while the image forming apparatus is in operation,
the audio explaining the first image has a peak frequency different from a peak frequency of a drive noise that is produced by the image forming apparatus in operation, and that is transmitted to a user in the first range of viewing angles, and
the audio explaining the second image has a peak frequency different from a peak frequency of a drive noise that is produced by the image forming apparatus in operation, and that is transmitted to a user in the second range of viewing angles.

10. The image forming apparatus of claim 1,
wherein the first image, which is projected in the first direction, indicates a first operation to be performed on a first portion of the image forming apparatus by a user located in the first range of viewing angles; and
wherein the second image, which is projected in the second direction, indicates a second operation to be performed on a second portion of the image forming apparatus by a user located in the second range of viewing angles.

11. An image forming apparatus comprising:
an operation part operable to receive an input from a user;
a display part operable to simultaneously display both: (i) a first image projected in a first direction so as to be visible only from a first range of viewing angles, and (ii) a second image projected in a second direction so as to be visible only from a second range of viewing angles that does not overlap with the first range of viewing angles;
a detector operable to detect a location of the user with respect to the operation part;
a selector operable to select an audio to be output based on the location detected by the detector, the audio to be output being one of an audio explaining the first image and an audio explaining the second image; and
an audio output part operable to output the selected audio.

12. The image forming apparatus of claim 11, wherein
based on the location detected by the detector, the selector selects the audio explaining the first image when judging that the user is present in the first range of viewing angles, and selects the audio explaining the second image when judging that the user is present in the second range of viewing angles.

13. The image forming apparatus of claim 12, wherein
the audio output part is further operable, after outputting the selected audio at a first volume, to output a non-selected audio at a second volume that is lower than the first volume, the non-selected audio being one of the audio explaining the first image and the audio explaining the second image.

14. The image forming apparatus of claim 13, wherein
while the image forming apparatus is in operation,
the audio explaining the first image has a peak frequency different from a peak frequency of a drive noise that is produced by the image forming apparatus in operation, and that is transmitted to a user in the first range of viewing angles, and
the audio explaining the second image has a peak frequency different from a peak frequency of a drive noise that is produced by the image forming apparatus in operation, and that is transmitted to a user in the second range of viewing angles.

15. The image forming apparatus of claim 12, wherein
while the image forming apparatus is in operation,
the audio explaining the first image has a peak frequency different from a peak frequency of a drive noise that is produced by the image forming apparatus in operation, and that is transmitted to a user in the first range of viewing angles, and
the audio explaining the second image has a peak frequency different from a peak frequency of a drive noise that is produced by the image forming apparatus in operation, and that is transmitted to a user in the second range of viewing angles.

16. The image forming apparatus of claim 11, wherein
the audio output part is further operable, after outputting the selected audio at a first volume, to output a non-selected audio at a second volume that is lower than the first volume, the non-selected audio being one of the audio explaining the first image and the audio explaining the second image.

17. The image forming apparatus of claim 16, wherein
while the image forming apparatus is in operation,
the audio explaining the first image has a peak frequency different from a peak frequency of a drive noise that is produced by the image forming apparatus in operation, and that is transmitted to a user in the first range of viewing angles, and
the audio explaining the second image has a peak frequency different from a peak frequency of a drive noise that is produced by the image forming apparatus in operation, and that is transmitted to a user in the second range of viewing angles.

18. The image forming apparatus of claim 11, wherein
while the image forming apparatus is in operation,
the audio explaining the first image has a peak frequency different from a peak frequency of a drive noise that is produced by the image forming apparatus in operation, and that is transmitted to a user in the first range of viewing angles, and
the audio explaining the second image has a peak frequency different from a peak frequency of a drive noise that is produced by the image forming apparatus in operation, and that is transmitted to a user in the second range of viewing angles.

19. The image forming apparatus of claim 11,
wherein the first image, which is projected in the first direction, indicates a first operation to be performed on a first portion of the image forming apparatus by a user located in the first range of viewing angles; and
wherein the second image, which is projected in the second direction, indicates a second operation to be performed on a second portion of the image forming apparatus by a user located in the second range of viewing angles.

* * * * *